US011888554B2

(12) United States Patent
Wu et al.

(10) Patent No.: US 11,888,554 B2
(45) Date of Patent: Jan. 30, 2024

(54) AUTOMOTIVE MIMO RADAR SYSTEM USING EFFICIENT DIFFERENCE CO-ARRAY PROCESSOR

(71) Applicant: NXP USA, Inc., Austin, TX (US)

(72) Inventors: Ryan Haoyun Wu, San Jose, CA (US); Filip Alexandru Rosu, Bucharest (RO); Daniel Silion, Bucharest (RO); Tudor Bogatu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 356 days.

(21) Appl. No.: 17/443,635

(22) Filed: Jul. 27, 2021

(65) Prior Publication Data

US 2022/0094397 A1    Mar. 24, 2022

(30) Foreign Application Priority Data

Sep. 23, 2020 (RO) .............................. a 2020 00601

(51) Int. Cl.
*H04B 7/0426* (2017.01)
*G01S 13/89* (2006.01)
*H04L 5/00* (2006.01)
*G01S 13/931* (2020.01)

(52) U.S. Cl.
CPC .............. *H04B 7/043* (2013.01); *G01S 13/89* (2013.01); *G01S 13/931* (2013.01); *H04L 5/0007* (2013.01)

(58) Field of Classification Search
CPC .... H04B 7/024; H04B 7/0413; H04B 7/0417; H04B 7/043; H04L 5/0023; H04L 25/03343; H04L 5/0007; G01S 13/89; G01S 13/931
See application file for complete search history.

(56) References Cited

U.S. PATENT DOCUMENTS

| 3,487,462 A | 12/1969 | Holberg |
| 3,812,493 A | 5/1974 | Afendykiw et al. |
| 4,994,809 A | 2/1991 | Yung et al. |
| 9,638,793 B2 | 5/2017 | Wang et al. |

(Continued)

FOREIGN PATENT DOCUMENTS

| EP | 2916140 A2 | 9/2015 |
| EP | 3136122 A1 | 3/2017 |

(Continued)

OTHER PUBLICATIONS

U.S. Appl. No. 16/356,764 NFOA dated Jul. 8, 2021, 9 pages.

(Continued)

*Primary Examiner* — Peter M Bythrow

(57) ABSTRACT

A radar system, apparatus, architecture, and method are provided for generating a difference co-array virtual aperture by using a radar control processing unit to coherently combine virtual array apertures from multiple small aperture radar devices to construct a sparse MIMO virtual array aperture and to construct an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture.

20 Claims, 10 Drawing Sheets

(56) References Cited

U.S. PATENT DOCUMENTS

| | | | |
|---|---|---|---|
| 10,509,104 | B1 | 12/2019 | Dato |
| 10,641,881 | B2 | 5/2020 | Searcy et al. |
| 10,771,124 | B2* | 9/2020 | Fang .................... H04B 7/0413 |
| 11,092,683 | B2* | 8/2021 | Wu ........................ G01S 13/584 |
| 11,435,435 | B2* | 9/2022 | Kim ......................... H01Q 21/06 |
| 11,520,030 | B2* | 12/2022 | Wu ........................ G01S 13/325 |
| 2007/0285315 | A1* | 12/2007 | Davis ..................... H01Q 21/22 |
| | | | 342/377 |
| 2009/0262004 | A1 | 10/2009 | Wen et al. |
| 2014/0111372 | A1 | 4/2014 | Wu |
| 2015/0253419 | A1* | 9/2015 | Alland .................... G01S 13/42 |
| | | | 342/385 |
| 2016/0018511 | A1 | 1/2016 | Nayyar et al. |
| 2016/0077196 | A1 | 3/2016 | Dehlink et al. |
| 2016/0103206 | A1 | 4/2016 | Pavao-Moreira et al. |
| 2016/0109559 | A1 | 4/2016 | Delbecq et al. |
| 2016/0124086 | A1 | 5/2016 | Jansen et al. |
| 2016/0131752 | A1 | 5/2016 | Jansen et al. |
| 2016/0146931 | A1 | 5/2016 | Rao et al. |
| 2016/0157828 | A1* | 6/2016 | Sumi ...................... G01N 29/46 |
| | | | 702/189 |
| 2016/0223643 | A1 | 8/2016 | Li et al. |
| 2016/0266239 | A1 | 9/2016 | Pavao-Moreira et al. |
| 2016/0285172 | A1* | 9/2016 | Kishigami .............. G01S 7/023 |
| 2017/0293025 | A1* | 10/2017 | Davis ..................... G01S 7/023 |
| 2017/0315221 | A1 | 11/2017 | Cohen et al. |
| 2018/0088221 | A1 | 3/2018 | Yomo et al. |
| 2018/0088224 | A1* | 3/2018 | Kishigami .............. G01S 13/46 |
| 2018/0115409 | A1 | 4/2018 | Nayyar et al. |
| 2018/0128910 | A1 | 5/2018 | Lee |
| 2018/0210067 | A1 | 7/2018 | Bilik et al. |
| 2019/0041494 | A1 | 2/2019 | Roger et al. |
| 2019/0285738 | A1* | 9/2019 | Iwasa .................... H01Q 1/3233 |
| 2019/0293753 | A1* | 9/2019 | Iwasa .................... G01S 7/2813 |
| 2020/0011968 | A1* | 1/2020 | Hammes ............... G01S 13/003 |
| 2020/0284877 | A1 | 9/2020 | Ahmed |
| 2020/0300965 | A1* | 9/2020 | Wu ........................ G01S 7/2883 |
| 2020/0300995 | A1* | 9/2020 | Wu ........................... G01S 7/41 |
| 2020/0301002 | A1* | 9/2020 | Wu ........................... G01S 7/41 |
| 2020/0371229 | A1* | 11/2020 | Levitan ................. G01S 13/872 |
| 2020/0400808 | A1* | 12/2020 | Hammes ............... G01S 7/0233 |
| 2021/0011121 | A1 | 1/2021 | Arbabian et al. |
| 2021/0156981 | A1* | 5/2021 | Stettiner ............... G01S 7/0232 |
| 2022/0163623 | A1* | 5/2022 | Kishigami .............. G01S 13/42 |

FOREIGN PATENT DOCUMENTS

| | | |
|---|---|---|
| WO | PCT-2018/115370 A1 | 6/2018 |
| WO | PCT-2020158009 A1 | 8/2020 |

OTHER PUBLICATIONS

U.S. Appl. No. 16/356,764 NOA dated Oct. 28, 2021, 13 pages.
U.S. Appl. No. 16/356,776 NOA dated Apr. 29, 2021, 11 pages.
U.S. Appl. No. 16/356,792 FOA dated Mar. 10, 2022, 30 pages.
U.S. Appl. No. 16/356,792 NFOA dated Jul. 6, 2020, 37 pages.
U.S. Appl. No. 16/356,792 Notice of Allowance dated Aug. 11, 2022, 16 pages.
D. Kalogerias, et al., "Sparse sensing in colocated MIMO radar: A matrix completion approach," IEEE International Symposium on Signal Processing and Information Technology, 2013, pp. 000496-000502, doi: 10.1109/ISSPIT .2013.6781930. (Year: 2013).
Alexander Ganis et al., A portable 3D Imaging FMCW MIMO Radar Demonstrator with a 24×24 Antenna Array for Medium Range Applications, IEEE Transactions on Geoscience and Remote Sensing, vol. 56, Issue:1, Jan. 2018), Sep. 22, 2017, pp. 298-312.
Anil Kumar K V et al., Texas Instruments, Application Report, SWRA574A—Oct. 2017, revised Dec. 2017, AWR2243 Cascade, http://www.tij.co.jp/jp/lit/an/swra574a/swra574a.pdf, pp. 1-15.
Chun-Lin Liu, Sparse Array Signal Processing: New Array Geometries, Parameter Estimation, and Theoretical Analysis, Caltech, California Institute of Technology, Pasadena, CA, USA, May 14, 2018, pp. 1-305.
Florian Starzer et al., A Novel 77-GHz Radar Frontend with 19-GHz Signal Distribution on RF-PCB Substrate, 2010 Topical Meeting on Silicon Monolithic Integrated Circuits in RF Systems (SiRF), Jan. 11-13, 2010, https://ieeexplore.ieee.org/stamp/stamp.jsp?tp=&arnumber=5422941, pp. 360-363.
Jasbir Singh et al., Texas Instruments, AWR1642 mmWave sensor: 76-81-GHz radar-on-chip for short-range radar applications, 2017, http://www.ti.com/lit/wp/spyy006/spyy006.pdf, pp. 1-8.
NXP, Analog, Mixed Signal and Power Management, MR2001-77 GHZ Radar Transceiver Chipset, 2015, pp. 1-3.
Paul Swirhun, Millimeter-Wave Circuit Design for Radar Transceivers, Technical Report No. UCB/EECS-2013-192, Dec. 1, 2013, https://www2.eecs.berkeley.edu/Pubs/TechRpts/2013/EECS-2013-192.pdf, pp. 1-86.
R. Feger et al., A 77-GHz FMCW MIMO Radar Based on Loosely Coupled Stations, The 7th German Microwave Conference, Mar. 12-14, 2012, https://ieeexplore.ieee.org/document/6185182/, pp. 1-4.
Raza, Ahsan et al., Thinned Coprime Array for Second-Order Difference Co-Array Generation With Reduced Mutual Coupling, IEEE Transactions on Signal Processing, Apr. 15, 2019, vol. 67, No. 8, IEEE, Piscataway, NJ, USA, pp. 2052-2065.
Yang, Yang et al., Some Phase Synchronisation Algorithms for Coherent MIMO Radar, 45th Annual Conference on Information Sciences and Systems, Mar. 23, 2011, IEEE, Piscataway, NJ, USA, pp. 1-6.
Zhe Wang et al., Nested Array Sensor with Grating Lobe Suppression and Arbitrary Transmit-Receive Beampattern Synthesis, IEEE, vol. 6, published Feb. 9, 2018, current draft Mar. 13, 2018, pp. 9227-9237.

* cited by examiner

AUTOMOTIVE MIMO RADAR SYSTEM USING EFFICIENT DIFFERENCE CO-ARRAY PROCESSOR

BACKGROUND OF THE INVENTION

Cross-Reference to Related Applications

U.S. patent application Ser. No. 16/356,792, entitled "High Resolution Automotive Radar System with Forward and Backward Difference Co-Array Processing," by inventor Ryan H. Wu, Attorney Docket No. 82144509US01, filed on Mar. 18, 2020, which is incorporated by reference in its entirety as is fully set forth herein.

This application claims the priority under 35 U.S.C. § 119 of Romania application no. A202000601, filed on 23 Sep. 2020, the contents of which are incorporated by reference herein.

FIELD OF THE INVENTION

The present invention is directed in general to radar systems and associated methods of operation. In one aspect, the present invention relates to an automotive radar system formed with independent distributed radars.

DESCRIPTION OF THE RELATED ART

Radar systems may be used to detect the location and velocity of nearby targets. With advances in technology, radar systems may now be applied in many different applications, such as automotive radar safety systems, but not every radar system is suitable for every application. For example, 77 GHz Frequency Modulation Continuous Wave (FMCW) Fast Chirp Modulation (FCM) radars are used as primary sensors in Advanced Driver Assistance System (ADAS) and are used as safety sensors in autonomous driving (AD) systems, but are not used as the primary sensor in AD systems due to limited angular resolution performance. To enable the use of such radar systems as the primary sensor for driver replacement in AD systems, such systems must provide better angular resolution, but this typically requires larger antenna apertures, and therefore physically larger radars. Unfortunately, the requirement of having larger radars can conflict with other design and/or operational constraints, such as integrating a large aperture radar into a vehicle which has competing requirements for design, structure, and/or operation. For example, the front of a vehicle may have design or structural elements (e.g., headlights, design emblems, bumpers, etc.) that do not readily admit the addition of a large aperture radar. Keeping the size of radar sufficiently small so it can be integrated with other parts of the vehicle implies that the aperture of the radar is constrained and thus the angular resolution is limited.

Existing radar systems have attempted to address these challenges by using techniques (e.g., bistatic multiple-input multiple-output radar) which effectively combine a plurality of distributed, smaller aperture radars to form a larger virtual aperture. However, these techniques typically require that the distributed radars share a common reference local oscillator (LO) signal (so the radars operate on the same frequency and time reference) and/or require complex and expensive modifications to hardware and software to cross-correlate or mix target return signals with the signals from other transmitters. Unfortunately, these requirements may not be possible due to car integration, complexity, and/or cost constraints which prevent such solutions from being robustly and economically implemented. In addition, existing solutions for generating virtual apertures require many complex calculations that are not suitable for implementation with software due the huge computational overhead and resulting processing time requirements, and there are also prohibitive hardware costs with implementing the complex calculations entirely with an application specific integrated circuit or hardware. As seen from the foregoing, the existing radar system solutions are extremely difficult at a practical level by virtue of the challenges with achieving the performance benefits of larger size radars within the performance, design, complexity, and cost constraints of existing radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
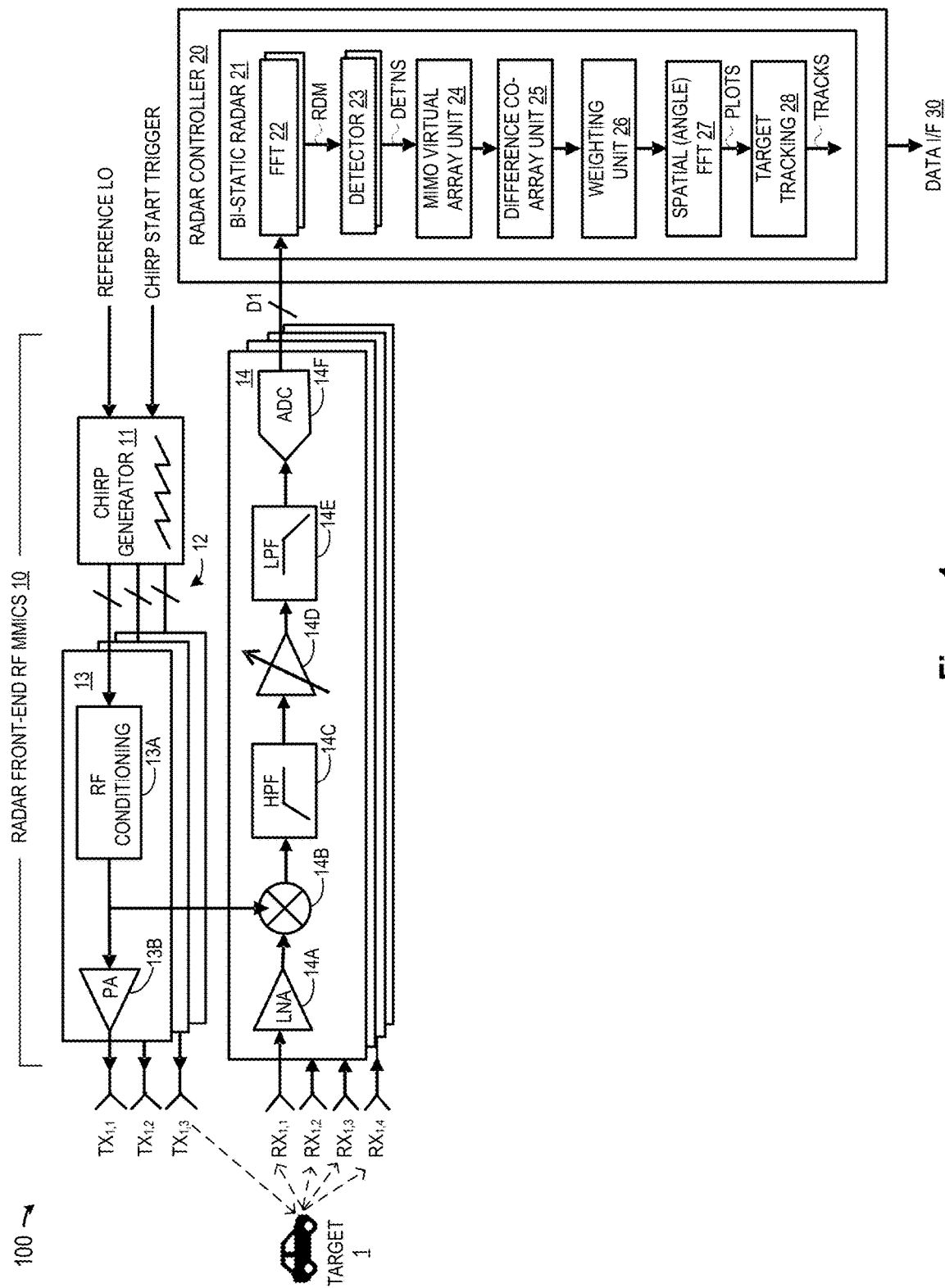
FIG. 1 is a simplified schematic diagram of a linear frequency modulation automotive radar system in accordance with selected embodiments of the present disclosure.

A distributed aperture radar system, hardware circuit, system, architecture, and methodology are described for jointly producing target scene information with multiple coherent radars by using a spectral-domain auto-correlation based approach that leverages FFT hardware accelerators to construct a difference co-array with a virtual large aperture from a sparse array. In selected embodiments, a signal processing methodology and algorithm are disclosed for difference co-array construction and angle processing by constructing and accumulating MIMO virtual array outputs and then performing forward and backward difference co-array processing and construction for cascaded physical and virtual array processing to mitigate or suppress spurious sidelobes in the formed radar beam pattern. Rather than computing the difference co-array output with an inefficient sorting and grouping operation, the difference co-array output is efficiently computed using spectral domain approach that uses FFT hardware accelerators. In addition, a new weighting approach is also introduced which further mitigates the spurious sidelobes present in the difference co-array angle spectrums. By providing a combined hardware and software solution for forward and backward single-frame difference co-array beamforming signal processing, a difference co-array having an aperture that is many times larger than the total physical apertures combined is provided by filling sparse apertures with virtual elements, thereby achieving better sensitivity, finer angular resolution, and low false detection rate, resulting in very fine angular resolution while suppressing false detections due to spurious sidelobes. And by weighting the difference co-array beamforming output with a factor that is derived based on the inverse of the noise standard deviation, the spurious sidelobes present in the difference co-array angle spectrums can be further suppressed, resulting in very fine angular resolution.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure the radial distance and direction to a reflecting object and its relative radial velocity, and are characterized by performance criteria, such as the angular resolution (the minimum distance between two equal large targets at the same range and range rate (or radial velocity) resolution cell which a radar is able to distinguish and separate to each other), range resolution, sensitivity, false detection rate, and the like. Typically, frequency modulated continuous wave (FMCW) modulation techniques are used to identify the location and/or velocity of a radar target, such as a car or pedestrian, by transmitting FMCW modulated signals from multiple transmit antennas so that reflected signals from the radar target are received at multiple receive antennas and processed to determine the radial distance and relative radial velocity and direction for the radar target. However, with current automotive designs, a vehicle can include multiple radars which operate independently from one another. Typically, one radar's transmissions are not used by any other radars, and are instead treated as interferences which need to be avoided or suppressed to prevent interference. Alternatively, the outputs from individual radars are used independently or integrated in a non-coherent fashion or fused by the tracker. Techniques for non-coherently combining multiple front-end system-on-chip devices are known in literature; see for example the following references: P. Swirhun, "Millimeter-Wave Circuit Design for Radar Transceivers (2013); NXP Fact Sheet entitled "MR2001: 77 GHZ Radar Transceiver Chipset" (2015); and Texas Instruments publication entitled "AWR1642 mmWave sensor: 76-81-GHz radar-on-chip for short-range radar applications" (2017). However, non-coherent integration or track fusion does not increase the system angular performance.

And while there are systems which combine distributed apertures to form a larger aperture, such systems typically require that the distributed radars share a common reference local oscillator (LO) signal so the radars operate on the same frequency and time reference. The common reference LO signal is usually shared via physical wave-guide connections (e.g., PCB transmission lines, substrate integrated wave-guides, coaxial cables, etc.) or even wireless connections that have precisely measured phase delays within the frequency range of operation. Techniques for combining multiple front-end system-on-chip devices with a shared, distributed LO signal are known in literature; see for example the following references: F. Starzer et al., "A Novel 77-GHz Radar Frontend with 19-GHz Signal Distribution on RF-PCB Substrate," 2010 Topical Meeting on Silicon Monolithic Integrated Circuits in RF Systems (SiRF), pp. 152-155 (2010); U.S. Patent Pub'n. No. 2016/0018511A1 to J. Nayyar et al. entitled "Distributed Radar Signal Processing in a Radar System"; and "Texas Instruments Application Report, AWR1243 Cascade" (October 2017, revised December 2017). However, there are often situations where car integration constraints prevent such connections from being robustly and economically implemented.

As an alternative to physically sharing the LO signal, distributed apertures can also be combined in systems, such as bi-static radar systems, that form a single large aperture by having each radar receive the other radars' transmissions and then cross-correlate the target returns with the received transmissions from the other radars for estimating target parameters. Multi-static radar techniques are known in literature; see for example the following references: U.S. Pat. No. 3,487,462 to D. Holberg entitled "Bistatic radar configuration not requiring reference-data transmission"; U.S. Pat. No. 3,812,493 to M. Afendykiw et al. entitled "Bistatic passive radar"; and U.S. Pat. No. 4,994,809 to K. Tung et al. entitled "Polystatic correlating radar." Such approaches, however, require relatively complex and expensive modifications to existing automotive radar transceiver hardware and software because of the lack of the dedicated cross-correlator circuitry for the reference signal.

Another alternative is provided by Frequency Modulation Continuous Wave (FMCW) Fast Chirp Modulation (FCM) radars that are used as safety sensors in many Advanced Driver Assistance Systems (ADAS), but to provide sufficient angular resolution capability, such radar systems require large antenna apertures that present challenges for car integration. This dilemma can be overcome by forming a virtually large aperture from a physically smaller and sparsely populated antenna array, but such solutions require many complex calculations that are not suitable for implementation with software due the huge computational overhead and resulting processing time requirements. For example, processor-controlled Linear Frequency Modulation (LFM) radar transceivers may use monolithic microwave integrated circuits (MMICs) to feed one or more transmitting and receiving antenna elements so that the MMICs share a common local oscillator (LO) signal and operate in a coordinated and coherent fashion for multiple-input multiple-output (MIMO) operation. Using time-division, frequency-division, or code-division techniques to form MIMO apertures, the processor is programmed to command the MMICs to transmit MIMO waveforms, and the resulting target returns received by the antenna array is processed to detect range-Doppler peaks, and the peaks' cell outputs are further processed to construct a MIMO virtual array output vector. The MIMO array output vector may be processed further to form a forward and backward difference co-array before extracting angle information from the difference co-array output vector by means of Fourier analysis (e.g., DFT or FFT) and peak detection or other approaches. However, conventional approaches for computing the difference co-array output use sorting and grouping operations that are inefficient in terms of the processing resources and computational time required.

To address these limitations from conventional solutions and others known to those skilled in the art, reference is now made to FIG. 1 which depicts a simplified schematic diagram of a distributed coherent radar system 100 which includes one or more distributed radar front-end RF MMIC devices 10 connected to a radar controller processor 20. In selected embodiments, each radar front-end RF MMIC device 10 may be embodied as a line-replaceable unit (LRU) or modular component that is designed to be replaced quickly at an operating location. Similarly, the radar controller processor 20 may be embodied as a line-replaceable unit (LRU) or modular component. As will be appreciated, any desired number of radar front-end RF MMIC devices 10 may be used. In addition, the depicted radar system 100 may be implemented in integrated circuit form with the distributed radar front-end RF MMIC devices 10 and the radar controller processor 20 formed with separate integrated circuits (chips) or with a single chip, depending on the application.

Each distributed radar front-end RF MMIC device 10 includes one or more transmitting antenna elements $TX_i$ and receiving antenna elements $RX_j$ connected, respectively, to one or more radio-frequency (RF) transmitter (TX) units 13 and receiver (RX) units 14. For example, each radar device (e.g., 10) is shown as including individual antenna elements (e.g., $TX_{1,i}$, $RX_{1,j}$) connected, respectively, to three transmitter modules (e.g., 13) and four receiver modules (e.g., 14), but these numbers are not limiting and other numbers are also possible, such as four transmitter modules 13 and six receiver modules 14, or a single transmitter module 13 and/or a single receiver modules 14. Each radar device 10 also includes a chirp generator 11 which is configured and connected to supply a chirp input signal 12 to the transmitter modules 13. To this end, the chirp generator 11 is connected to receive a reference local oscillator (LO) signal and a chirp start trigger signal. In selected embodiments, multiple transmitter elements 13 may operate in a non-coherent fashion because, even though they are programmed to transmit identical waveforms and share a common schedule, the generated waveforms are likely to have distinct starting frequencies, phases, and transmitting time due to different timing and phases for the reference LO signal and signal path differences for the chirp start trigger signal.

The radar system 100 also includes a radar controller processing unit 20 that is connected to supply input control signals to the distributed radar front-end RF MMIC device 10 and to receive therefrom digital output signals D1 generated by the receiver modules 14. In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or state machine signals for RF (radio frequency) circuit enablement sequences. In addition, the radar controller processor 20 may be configured to program the transmitter and receiver module 13, 14 to operate in a coordinated fashion by transmitting MIMO waveforms for use in constructing a virtual aperture from a combination of the distributed apertures formed by the distributed transmitting and receiving antenna elements $TX_i$, $RX_j$.

In the example shown, each chirp generator 11 generates a chirp signal 12 in response to a chirp start trigger signal and a corresponding reference local oscillator signal (Reference LO). The resulting chirp signal from each chirp generator 11 is then processed by the RF conditioning unit 13A and amplified at the power amplifier (PA) 13B which amplifies the signal to a level suitable for transmission as a radar signal by a transmitter antenna unit $TX_{1,i}$, $TX_{2,i}$. Though not shown, it will be understood that the transmitter module 13 may include additional processing circuits, such as a digital-to-analog converter (DAC), phase shifter (or phase rotator), buffer, mixer, filter, and the like.

The radar signal transmitted by the transmitter antenna unit $TX_{1,i}$, $TX_{2,i}$ may by reflected by a target object, such as a vehicle 1. Part of the reflected radar signal (e.g., monostatic target returns) reaches receiver antenna units $RX_{1,i}$ at the first distributed radar front-end RF MMIC device 10, and another part (e.g., bi-static target returns) reaches receiver antenna units $RX_{2,i}$ at a second distributed radar front-end RF MMIC device 10. At each receiver module 14, the received (radio frequency) antenna signal is amplified by a low noise amplifier (LNA) 14A and then fed to a mixer 14B where it is mixed with the RF conditioned signal generated by the RF conditioning unit 13. The resulting intermediate frequency signal is fed to a first high-pass filter (HPF) 14C. The resulting filtered signal is fed to a first variable gain amplifier 14D which amplifies the signal before feeding it to a first low pass filter (LPF) 14E. This re-filtered signal is fed to an analog/digital converter (ADC) 14F and is output by each receiver module 14 as a digital signal D1. At the radar controller 20, the digital signal D1 is processed by the bi-static radar modules 21-28 as described hereinbelow.

In order for each receiver module 14 to be able to distinguish transmitted radar signals from reflected radar signals, the transmitted radar signals may be coded so they can be separated at the receiver modules 14. Such separability can be achieved with code-division multiple access (CDMA), frequency-division multiple access (FDMA), or time-division multiple access (TDMA) techniques. For example, the transmitter antenna units $TX_i$ on each distributed radar device (e.g., 10) may be controlled and configured to transmit one at a time to form a Time-Division MIMO aperture. In another example, each transmitter antenna unit $TX_i$ may be controlled and configured to transmit with an amount of frequency shift for forming Doppler-Division (DD) or Frequency-Division (FD) MIMO apertures. In yet another example, each transmitter antenna units $TX_i$ may be controlled and configured to transmit all at once, but with chirps coded with pseudo-random sequences that are orthogonal across transmitters for forming Code-Division (CD) MIMO apertures.

Under control of the radar controller processor 20, the distributed coherent radar system 100 is configured to operationally combine multiple, physically separated small-aperture radars 10 to function as a single large coherent aperture radar. To this end, the radar controller processor 20 may include a radar controller processor 20 which is configured to command the distributed radar MMICs 10 to transmit MIMO waveforms according to an orthogonal schedule or coding scheme. The transmitted waveform signal radiates out from the transmitter antenna units $TX_i$ and is reflected by the target 1 in the field of view of the antennas so that the echo or returns are received by the receiver antenna units $RX_j$. At the receiver module(s) 14, the received signal is pulse compressed and coherently integrated, matched filtered, and then passed to the bi-static radar module 21 for CFAR detection to detect the range-Doppler peaks, construction of MIMO virtual arrays, construction of beamforming outputs of an extended difference co-array virtual array aperture using FFT hardware accelerator, and computation of a target map from the beamforming outputs to identify the range, Doppler, and angle values for one or more detected targets identified by the target returns. In particular, the digital output signals D1 generated by the receiver module 14 is processed with bistatic radar modules 21-26 to construct and accumulate multiple-input multiple-output (MIMO) array outputs to form a MIMO aperture for use in computing the plots generated by the spatial (angle) FFT module 27 and target tracks generated by the target tracking module 28. For example, the digital output signals D1 may be processed by one or more FFT modules 22, such as a fast-time (range) FFT module and slow-time (Doppler) FFT module, thereby generating the range-Doppler map (RDM). In turn, the RDM outputs are then passed through a CFAR detection module 23 to obtain the range-Doppler peak detections which are then further processed to construct a MIMO virtual array output vector at modules 24-26.

In particular, the radar controller processor 20 may be configured with a MIMO virtual array unit 24 which is operative to alternate the transmitting "master" role among the distributed radar devices 10 so that an extended MIMO aperture can be formed based on MIMO radar principles. In operation, the MIMO virtual array unit 24 sequentially selects each of the distributed radar devices 10 to serve as the "master" radar while the remaining radar devices operate as "slave" radar(s) until all of the distributed radar devices 10 have been selected as the master unit once. The selected master-unit radar device transmits radar waveforms and the slave-unit radar device(s) directionally receive and process the master radar's transmitted waveforms using identical range and Doppler processing steps for normal radar waveforms. With each slave radar producing coherent target measurements, the radar controller processor 20 constructs and accumulates mono-static and bi-static MIMO array outputs. The resulting bi-static MIMO aperture is even larger than the combined physical size of the distributed apertures, which results in greatly improved angular resolution performance. If there are multiple sections of the resulting MIMO array, the MIMO virtual array unit 24 may be configured to identify and select the least-sparse section of the MIMO array to compute a first set of beamforming outputs.

As will be appreciated, the spacing and arrangement of the transmitting and receiving antenna elements $TX_i$, $RX_j$ may result in the construction of a sparse bi-static MIMO array (e.g., contains holes or gaps), resulting in high grating lobes in the formed radar beam pattern. To address the potential grating or spurious lobe issues of sparse arrays, the radar controller processor 20 may be configured with a co-array processing module which is operative to perform forward and backward difference co-array processing and cascaded physical and virtual array processing as a mitigation technique for suppressing the spurious sidelobes. In operation, the radar controller processor 20 uses the co-array processing module to construct forward and backward difference co-array outputs based on the MIMO array outputs. If the formed difference co-array is uniformly spaced, the radar controller processor 20 may perform spatial smoothing on the difference co-array outputs. In addition or in the alternative, the radar controller processor 20 may be configured to compute a second beamforming output based on the (spatially-smoothed) co-array outputs, and then compute a composite beamforming output based on the first and the second beamforming outputs. Based on this processing, the radar controller processor 20 may then generate and output the target Range-Doppler-Angle map data over a data interface (I/F) to other automotive systems.

The co-array processing module may use a predetermined sequence of processing steps to perform forward and backward difference co-array processing to mitigate the spurious sidelobes due to spatial under and non-uniform sampling. An example processing sequence is described hereinbelow with reference to FIG. 2 which is a simplified diagrammatic depiction 200 of a difference co-array 203 constructed from a multi-element sparse MIMO array 202 having antenna elements located at the indicated antenna position 201. In this example sequence, the MIMO virtual array 202 is constructed first, and then for each range-Doppler cell to be processed, its antenna outputs across the formed MIMO array 202 are further processed to construct the difference co-array 203 by filling the gaps in the MIMO virtual array 202. Without loss of generality, linear array with equally spaced spatial samples are assumed.

Figure 2:
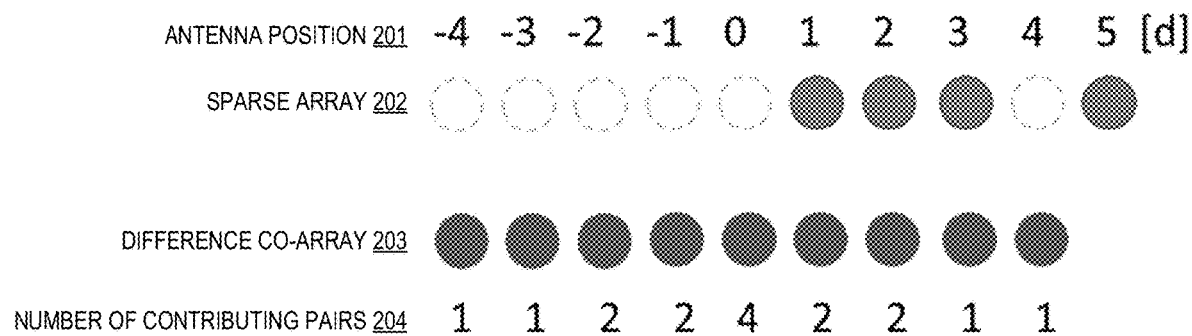
FIG. 2 is a simplified diagrammatic depiction of a difference co-array constructed from a multi-element sparse MIMO array in accordance with selected embodiments of the present disclosure.

With reference to the MIMO virtual array aperture 202 shown in FIG. 2, the i-th MIMO virtual array antenna element's position may be denoted as $x_i=n_i*d$, where d is the unit element spacing in meters and $n_i$ is an integer. Ideally, d should be half wavelength for sampling the entire 180-degree field of view without ambiguity. In practice, the antenna's field of view is smaller than 180 degrees, so a larger spacing than half wavelength is the cause of angular grating lobes or ambiguous angle detections.

The forward and backward difference co-array construction starts by constructing element pairs with respect to difference element-pair spacing. In an example where there are four antenna elements where $[x_1, x_2, x_3, x_4]=[1, 2, 3, 5]*d$, then the co-array virtual element is denoted $x_{i,j}=x_i-x_j$.

For construction of the difference co-array, the difference spacing from all combinations are listed below:

$$x_{1,1} = 0$$

$$x_{2,1} = d$$

$$x_{3,1} = 2d$$

$$x_{4,1} = 4d$$

$$x_{2,2} = 0$$

$$x_{3,2} = d$$

$$x_{4,2} = 3d$$

$$x_{3,3} = 0$$

$$x_{4,3} = 2d$$

$$x_{4,4} = 0$$

$$x_{1,2} = -d$$

$$x_{1,3} = -2d$$

-continued $$x_{1,4} = -4d$$

$$x_{2,3} = -d$$

$$x_{2,4} = -3d$$

$$x_{3,4} = -2d$$

Upon grouping the antenna pair indices by difference spacing values, a list of difference co-array elements spacings may be constructed as shown in Table 1:

TABLE 1

| Difference Co-Array Element Spacing | Antenna Pair Indices |
| --- | --- |
| −4d | $x_{1,4}$ |
| −3d | $x_{2,4}$ |
| −2d | $x_{1,3}, x_{3,4}$ |
| −d | $x_{1,2}, x_{2,3}$ |
| 0 | $x_{1,1}, x_{2,2}, x_{3,3}, x_{4,4}$ |
| d | $x_{2,1}, x_{3,2}$ |
| 2d | $x_{3,1}, x_{4,3}$ |
| 3d | $x_{4,2}$ |
| 4d | $x_{4,1}$ |

The pair-wise difference operation indicates that a difference co-array aperture of the size of nine (9) elements can be constructed from the four (4) element sparse MIMO virtual array. The formed element outputs of the difference co-array may be calculated based on the pair indices as follows.

First, the i-th MIMO antenna output is denoted as $y_i$, which is the k-th difference co-array element's output. Based on antenna pair indices $\{x_{i1,j1}, \ldots, x_{iM,jM}\}$, the k-th difference co-array element should be calculated as $$z_k = \frac{1}{M} \sum_{m=1}^{M} y_{im} y_{jm}^*.$$

The resulting forward and backward difference co-array element output is shown in Table 2:

TABLE 2

| Difference Co-Array Element Spacing | Antenna Pair Indices | Virtual element output |
| --- | --- | --- |
| −4d | $x_{1,4}$ | $z_{-4} = y_1 y_4^* = z_4^*$ |
| −3d | $x_{2,4}$ | $z_{-3} = y_2 y_4^* = z_3^*$ |
| −2d | $x_{1,3}, x_{3,4}$ | $z_{-2} = \frac{1}{2}(y_1 y_3^* + y_1 y_4^*) = z_2^*$ |
| −d | $x_{1,2}, x_{2,3}$ | $z_{-1} = \frac{1}{2}(y_1 y_2^* + y_2 y_3^*) = z_1^*$ |
| 0 | $x_{1,1}, x_{2,2}, x_{3,3}, x_{4,4}$ | $z_0 = \frac{1}{4}(y_1 y_1^* + y_2 y_2^* + y_3 y_3^* + y_4 y_4^*)$ |
| D | $x_{2,1}, x_{3,2}$ | $z_1 = \frac{1}{2}(y_2 y_1^* + y_3 y_2^*)$ |
| 2d | $x_{3,1}, x_{4,3}$ | $z_2 = \frac{1}{2}(y_3 y_1^* + y_4 y_3^*)$ |
| 3d | $x_{4,2}$ | $z_3 = y_4 y_2^*$ |
| 4d | $x_{4,1}$ | $z_4 = y_4 y_1^*$ |

As seen from above, each virtual element output in the backward difference co-array (e.g., −4d) can be derived from the corresponding forward difference co-array outputs (e.g., 4d) by taking the complex conjugate. Note that, if FFT is used for estimating target angles and there are any uniform linear array positions missing an output, zero filling should be performed to provide outputs for the missing array positions. Also note that, while conventional approaches for designing difference co-arrays (e.g., the minimum redundancy array (MRA) technique) seek to minimize the redundancy by maximizing the forward difference co-array without any holes, selected embodiments of the present disclosure seek to maintain some redundancy since the averaging effect between the overlapping contributions is helpful for reducing spurious sidelobes. In this way, a balance may be achieved between the design objectives of creating a large aperture and an evenly spread redundancy. In selected embodiments, every virtual antenna array element results from an equal number of averaging contributions.

Once calculated, the virtual element outputs $\{z_{-4}, \ldots z_{-1}, z_0, z_1, \ldots z_4\}$ are then used as the outputs corresponding to an antenna array with element positions $\{-4d, -3d, -2d, -d, 0, d, 2d, 3d, 4d\}$. The formation of the difference co-array involves grouping pairs of elements of the MIMO array output vector according to their difference value. This is indicated in FIG. 2 with the difference co-array element at antenna position −4 having virtual element output $z_{-4}=y_1 y_4^*=z_4^*$ that is calculated from one contributing pair, $x_{1,4}$, the difference co-array element at antenna position −3 having virtual element output $$z_{-2} = \frac{1}{2}(y_1 y_3^* + y_3 y_4^*) = z_2^*$$

that is calculated from two contributing pairs, $x_{2,4}$, the difference co-array element at antenna position −2 having virtual element output $z_{-3}=y_2 y_4^*=z_3^*$ that is calculated from one contributing pair, $x_{1,3}$, $x_{3,4}$, and so on. Angle processing, such as beamforming, can then be carried out.

For any given MIMO array geometry, the grouping of elements of the MIMO array output vector must be identified in real time or pre-identified and hard coded. In selected embodiments, a streamlined "outer product" construction method may be implemented without the need for hard-coding the grouping. To illustrate this method, an input sparse MIMO array output vector y is designated or generated which includes missing elements filled with zeros, where $y=[y_1, y_2, y_3, \ldots, y_N]^T$. In addition, a subset of y, $y_{null} \in y$, is designated or generated which corresponds to the elements that are non-existent in the sparse MIMO vector y, wherein the elements of $y_{null}$ are all zeros. Based on the computed transpose $y^T$ and complex conjugate $y^*$ of the MIMO array output vector y, a first outer product matrix $R_{yy}$ is computed, where:

$$R_{yy} = y^* y^T = \begin{bmatrix} y_1^* y_1 & y_1^* y_2 & \cdots & y_1^* y_N \\ y_2^* y_1 & y_2^* y_2 & & y_2^* y_N \\ \vdots & & \ddots & \vdots \\ y_N^* y_1 & y_N^* y_2 & \cdots & y_N^* y_N \end{bmatrix}$$

By careful inspection, it can be observed that the main diagonal elements of the first outer product matrix $R_{yy}$ consist of the group members of the zero-difference co-array output. The lower-triangular off-diagonals consist of the $-(N-1)d, \ldots, -2d, -d$ difference groups of the difference co-array output, respectively starting from the lower-left corner. Similarly, the upper-triangular off-diagonals consist of the d, 2d, 3d, . . . , (N−1)d difference groups of the difference co-array output, respectively from the diagonal immediately above the main-diagonal. Based on this observation, the summing operation of each difference group can be implemented as the summing of each diagonal of $R_{yy}$. In addition, an averaging operation can be calculated by dividing the sum of each diagonal by the number of non-zero elements in the diagonal and storing the results in a vector c. Because they are constants, the average values can be calculated and stored for subsequent retrieval and use.

Instead of computing the average vector c by counting non-zero elements of each diagonal in the outer product matrix $R_{yy}$, a binary real-valued vector b can be constructed such that its 1-elements correspond to the non-zero elements of the input sparse MIMO array output vector y and its 0-elements correspond to the zero-elements of y. Based on the computed transpose $b^T$ of the binary real-valued vector b, a second outer product matrix $R_{bb}$ is computed, where:

$$R_{bb} = bb^T = \begin{bmatrix} b_1 b_1 & b_1 y_b & \cdots & b_1 b_N \\ b_2 b_1 & b_2 b_2 & & b_2 b_N \\ \vdots & & \ddots & \vdots \\ b_N b_1 & b_N b_2 & \cdots & b_N b_N \end{bmatrix}$$

By summing the diagonal elements of the second outer product matrix $R_{bb}$, a contributing number vector, $c=[c_{-N+1}, c_{-N+2}, \ldots c_{-1}, c_0, c_2, \ldots, c_{N-1}]T$, may be computed, where:

$$c_{-N+1} = b_N b_1$$
$$c_{-N+2} = b_{N-1} b_1 + b_N b_2$$
$$\vdots$$
$$c_0 = b_1 b_1 + b_2 b_2 + \ldots + b_N b_N$$
$$\vdots$$
$$c_{N-2} = b_1 b_{N-1} + b_2 b_N$$
$$c_{N-1} = b_1 b_N$$

The computation of the contributing number vector c is conducted once at system start and stored for later use.

For a typical automotive radar system-on-chip application, the summing of the elements of a diagonal of a matrix is not always the same as summing the elements of a vector since the memory locations of the diagonal elements may not be contiguous in the physical memory space. As a result, the summing operation cannot take advantage of the common block memory access scheme which retrieves a chunk of contiguous memory. For example, if the first column is in a contiguous memory block that can be read at once, the operation to read the entire column takes one (normalized) cycle, and reading the main diagonals would require N cycles because each of the element on the main diagonal resides in unique memory blocks. The block-access is most powerful when used in conjunction with a vector machine which can execute an instruction on an entire vector in one cycle. With a vector machine, a vector of N may be read in in one cycle and processed in the next cycle comparison if they can be block-read and the vector machine is at least of size N. However, for a scalar machine, the processing of N elements requires up to N cycles in addition to the N cycles to read them (if they are not block readable), for a total of 2N cycles required for the worst case scenario, compared to 2 cycles in the best case.

For analysis, the block memory access is assumed to be column-major and is of size N or is a pure random access without block access. In this case, the number of cycles to retrieve the elements of any diagonal simply equals to number of elements in the diagonal since each diagonal element resides in distinct memory block in the assumed scenario. In the case where a scalar machine is used, the total cycle count for diagonal element memory access, $c_{mem}$, can be computed as:

$$c_{mem} = 1 + 2 + \ldots + N - 1 + N + N - 1 + \ldots + 2 + 1 =$$
$$N + 2 \sum_{i=1}^{N-1} i = N + 2 \frac{(N-1)(1+N-1)}{2} = N^2.$$

Thus, the scalar machine computations of the first outer product matrix $R_{yy}$ requires $C_{outprod} = N^2$ multiplication and accumulation (MAC) operations. In addition, the scalar machine computations for averaging the diagonal subsets requires $C_{mean} = 1+2+ \ldots +N-1+N+N-1++2+1=N^2$ MAC operations, assuming each addition takes 1 MAC operation and the final division with elements of c takes also 1 MAC operation.

As will be appreciated, the division with elements of c can be implemented as the product with the elements of the element-wise inverse of c, $c^{-1}$, where $$c^{-1} = \left[ \frac{1}{c_{-N+1}}, \frac{1}{c_{-N+2}}, \ldots, \frac{1}{c_{-1}}, \frac{1}{c_0}, \frac{1}{c_2}, \ldots, \frac{1}{c_{N-1}} \right]^T,$$

which can be pre-calculated and stored as well. For zero elements of c, the division should be neglected and the corresponding elements in $c^{-1}$ should also be set to zeros to avoid the divide by zero error. Upon assuming that 1 cycle is require for each MAC operation, the total cycle count for computing the difference co-array output with a scalar machine is on the order of $3N^2$ cycles.

As seen from the foregoing, there are redundant computations that impair the computational efficiency for generating the difference co-array output. In particular, a closer inspection of the first outer product matrix $R_{yy}$ reveals that the matrix is Hermitian, or conjugate symmetric. This implies that the $R_{yy}[n, m]$ element is the complex conjugate of $R_{yy}[m, n]$. Stated another way, $R_{yy}[n, m]=R_{yy}[m, n]^*$ for any n≠m. As a result, the computation of the first outer product matrix $R_{yy}$ can be reduced by only computing the main diagonal and the lower diagonals (or upper diagonals, but not both lower and upper ones). This reduces the computational cost for memory accesses to $$c_{mem} = 1 + 2 + \ldots + N - 1 + N = \sum_{k=1}^{N} i = \frac{N(N+1)}{2}.$$

In addition, the cost for computing the conjugate product terms reduces to $$c_{outprod} = N^2 - (1 + 2 + \ldots + N - 1) = N^2 - \frac{(N-1)(1+N-1)}{2} = \frac{N(N+1)}{2}.$$

Also, the computational cost of taking the average reduces to $$c_{mean} = 1 + 2 + \ldots + N - 1 + N = \sum_{i=1}^{N} i = \frac{N(N+1)}{2}.$$

By adding the last step of populating the redundant part (N elements) of output, the total overall computational cost is reduced to 3/2N(N+1)+N when the reduced computation approach.

To remove the redundant computations and improve the computational efficiency for constructing the different co-array outputs, selected embodiments of the present disclosure provide a signal processing apparatus and hardware for constructing and accumulating MIMO virtual array outputs and then performing forward and backward difference co-array processing and construction for cascaded physical and virtual array processing to mitigate or suppress spurious sidelobes in the formed radar beam pattern. In the depicted distributed coherent radar system 100, the radar controller processor 20 uses the MIMO virtual array unit 24 to construct MIMO virtual apertures. And at the difference co-array processing unit 25, the MIMO virtual array is processed using a spectral-domain auto-correlation based approach to construct a forward and backward difference co-array with a virtual large aperture from a sparse array, thereby mitigating the potential grating lobe or spurious lobe issue of sparse arrays. The generated co-array output may be further weighted with a weighting unit 26 to suppress the sidelobes in the formed beam pattern by weighting the difference co-array beamforming output with a factor that is derived based on the inverse of the noise standard deviation.

In contrast to a outer-product based approach for constructing the difference co-array (which can require up to $3N^2$ cycles to process a sparse MIMO array of length N elements, including holes), the difference co-array processing unit 25 may be connected and configured to construct the difference co-array with fewer computational cycles by applying spectral domain processing. To more efficiently compute the difference co-array than by computing the outer product matrix, a spectrum value Y is computed by first generating a zero-padded sparse MIMO vector y' from the sparse MIMO vector y, where y'=[$y_1$, $y_2$, $y_3$, ..., $y_N$, 0, ..., 0]$^T$ (zero-pad to 2N-1 length), and then computing the spectrum value Y as the fast Fourier transform of y', where Y=fft{y'}=[$Y_1$, $Y_2$, $Y_3$, ..., $Y_{2N-1}$]$^T$. As will be appreciated, the spectrum value Y may be efficiently computed using a fast Fourier transform (FFT) operation which can be implemented with an FFT accelerator engine available on the radar control processor. Next, the element-wise product of the spectrum Y and its complex conjugate Y* are computed as Z=YY*. Lastly, the difference co-array output vector v is computed by first computing z as the inverse Fourier transform of Z (e.g., z=ifft{Z}) and then performing an element-wise division by the contributing number vector c, so that v[n]=z[n]/c[n] (n∈{−N+1, ..., N−1}).

In terms of computational complexity, the FFT operation on a length-(2N−1) vector is on the order of (2N−1)log$_2$(2N−1) cycles. Not counting the cost of conjugating, the complexity of computing Z is on the order of (2N−1) cycles. The inverse Fourier transform is another (2N−1)log$_2$(2N−1) cycles. The final element-wise division takes (2N−1) cycles. As a result, the overall complexity in this case is 2(2N−1) log$_2$(2N−1)+2(2N−1) cycles.

The above spectral domain processing implementation is based on the observation that the construction of the vector z can be thought as the auto-correlation of the vector y, where z=[$z_{-N+1}$, $z_{-N+2}$, ..., $z_{-1}$, $z_0$, $z_1$, ..., $z_{N-1}$]T, and where the elements of z relates to the elements of y by the following equations:

$$z_{-N+1} = y_N^* y_1$$
$$z_{-N+2} = y_{N-1}^* y_1 + y_N^* y_2$$
$$\vdots$$
$$z_0 = y_1^* y_1 + y_2^* y_2 + \ldots + y_N^* y_N$$
$$\vdots$$
$$z_{N-2} = y_1^* y_{N-1} + y_2^* y_N$$
$$z_{N-1} = y_1^* y_N$$

As shown below, the expression of the elements of z can be understood in terms of the inner product of two vectors, where the under-line notation, [•] marks the zero-time position (where index m=0)

$$z_{-N+1} = [\underline{0}, 0, \ldots 0, y_1, y_2, y_3,$$
$$\ldots, y_N] \cdot [\underline{y_1}, y_2, y_3, \ldots, y_N, 0, \ldots, 0]^* = y_N^* y_1$$
$$z_{-N+2} = [\underline{0}, \ldots 0, y_1, y_2, y_3, \ldots, y_N] \cdot [\underline{y_1}, y_2, \ldots, y_{N-1}, y_N, 0, \ldots, 0]^* =$$
$$y_{N-1}^* y_1 + y_N^* y_2$$
$$\vdots$$
$$z_0 = [\underline{y_1}, y_2, y_3, \ldots, y_N] \cdot [\underline{y_1}, y_2, y_3, \ldots, y_N]^* =$$
$$y_1^* y_1 + y_2^* y_2 + \ldots + y_N^* y_N$$
$$\vdots$$
$$z_{N-1} = [y_1, y_2, y_3, \ldots, \underline{y_N}, 0,$$
$$0, \ldots 0,] \cdot [0, \ldots, 0, \underline{y_1}, y_2, y_3, \ldots, y_N]^* = y_1^* y_N$$

Upon a closer inspection of the inner product expression, the following generalization is seen for computing z[n]=$\sum_{m=-\infty}^{\infty}$y[m+n]y[m]*. This computation coincides with the expression of the convolution of y(−n)* and y(n), or alternatively the expression of the discrete autocorrelation of discrete function y, which is also the auto-correlation of y where y[0]=$y_1$, y[1]=$y_2$, ..., y[N−1]=$y_N$ and zero based on the definition of cross-correlation (f*g)[n]$\triangleq \sum_{m=-\infty}^{\infty}$f[m]*g[m+n].

As will be appreciated, the time-domain cross-correlation can be implemented in the spectral domain based on the convolution theorem, following the equation $\mathcal{F}${f*g}= $\mathcal{F}${f}*· $\mathcal{F}${g}, where $\mathcal{F}${•} represents the Fourier transform and $\mathcal{F}${•}* is the complex conjugate of the Fourier transform. Based on above observation, the vector z can be constructed by first computing the spectrum value Y as the discrete Fourier transform of y via Fast Fourier Transform implementation, $\mathcal{F}${y}=FFT{y}=Y. Next, the spectral product Z of the spectrum Y and its complex conjugate Y* is computed as Z=YY*. In addition, the vector z is computed as the inverse Fourier transform of the spectral product Z via Inverse Fourier Transform implementation, z= $\mathcal{F}^{-1}${Z}=IFFT{Z}. If the inverse Fourier transform outputs spectral samples corresponding to the [0~2π] radian frequency, the samples may be rearranged to correspond to [−π~π] by moving the last half to the front. Finally, by multiplying the elements of z with the elements of $c^{-1}$, the final difference co-array output array v is computed as $v[n]=z[n]c^{-1}[n]$, (n=−N+1, . . . , N−1). Stated equivalently, the difference co-array output array v is computed as $$v[n] = \frac{z[n]}{c[n]} (n = -N + 1, \ldots, N - 1).$$

Figure 3:
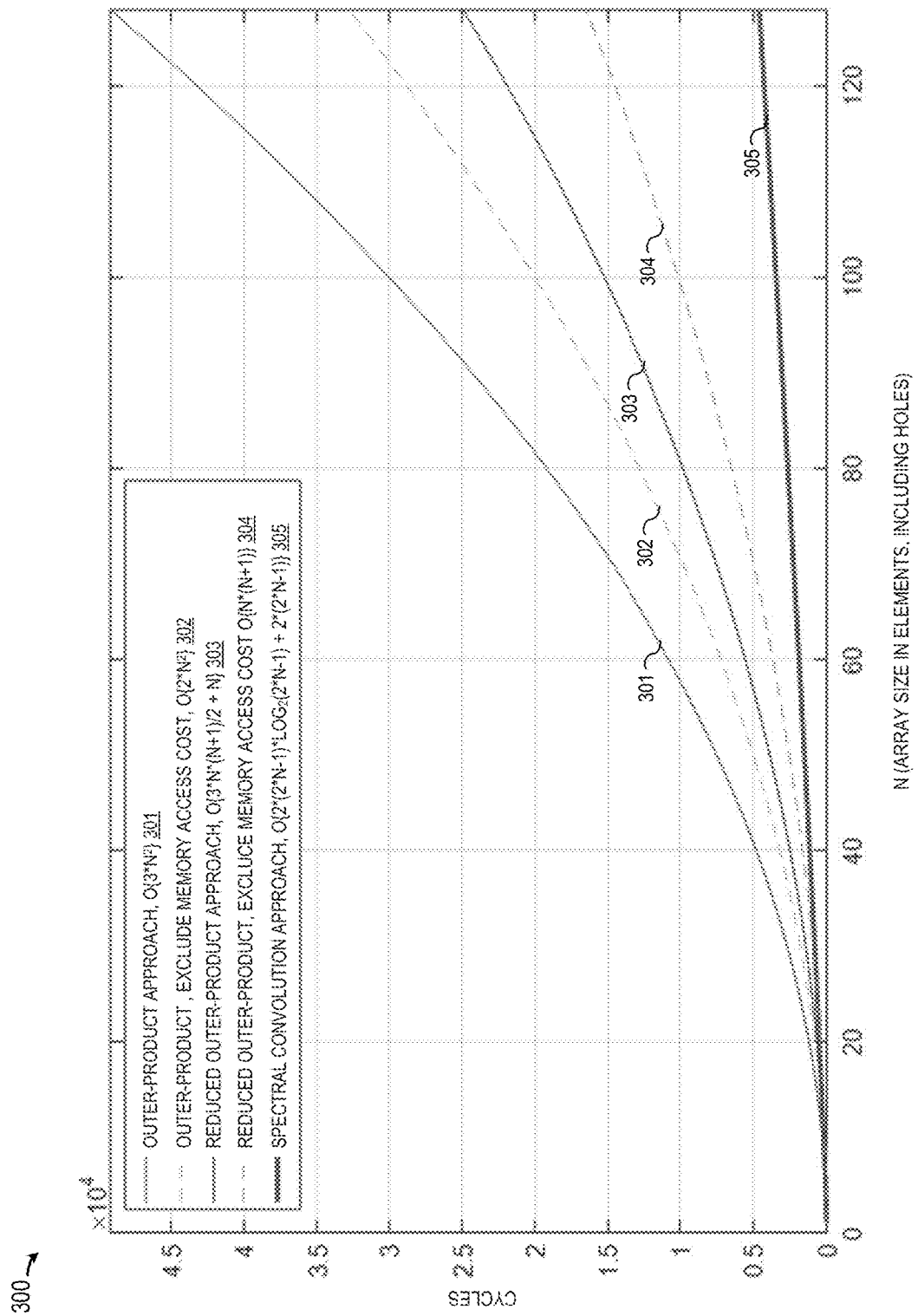
FIG. 3 graphically depicts the computational complexity of different outer-product base approaches for computing virtual arrays for comparison against the computational complexity of the spectral domain auto-correlation based approach of selected embodiments of the present disclosure.

To illustrate the relative computational complexity of the different approaches for computing the difference co-array vector, reference is now made to FIG. 3 which is a simplified diagrammatic depiction 300 of different outer-product base approaches for computing virtual arrays for comparison against the computational complexity of the spectral domain auto-correlation based approach of selected embodiments of the present disclosure. In particular, the outer product-based approach for computing the difference co-array output has a computational complexity plot line 301 that is function of the total cycle count of $3N^2$. If one excludes the memory access costs, the outer product-based approach for computing the difference co-array output has a computational complexity plot line 302 that is function of the total cycle count of $2N^2$. Using a reduced outer product approach where the total cycle count is (3N(N+1)/2+N), the outer product-based approach for computing the difference co-array output has a computational complexity plot line 303. And by excluding the memory access costs, the outer product-based approach for computing the difference co-array output has a computational complexity plot line 304 that is function of the total cycle count of (N(N+1)). In contrast to the outer-product based approaches, the spectral-domain autocorrelation based approach disclosed herein for computing the difference co-array output has a computational complexity plot line 305 that is function of the total cycle count of $(2(2N-1)\log_2(2N-1)+2(2N-1))$. As seen from the plot lines 301-305, the spectral-domain auto-correlation based approach 305 is more efficient than the outer-product based approaches 301-304, with the relative efficiency of the spectral domain auto-correlation based approach increasing with increasing size of the MIMO array. The computation burden for the spectral-domain auto-correlation based approach 305 scales quasi-linearly due to the log reduction, whereas the other outer-product based approaches scale quadratically. While improvements are also shown with the outer-product approaches 302-304 with reduced computation by considering the conjugate symmetric nature of the outer-product matrix performance, they are still not as efficient as the spectral domain auto-correlation approach.

The results of the difference co-array processing unit 25 are illustrated with FIG. 2's simplified diagrammatic depiction of a 4-element sparse MIMO array 202 which is processed to construct a 9-element difference co-array 203. As depicted, the distributed arrangement of four virtual antenna elements in a MIMO array 202 is generated from the physical transmit and receiver antennas on the distributed radar device 100. As will be appreciated, the MIMO virtual array aperture 202 has more elements than the physical array of transmit and receive antennas and occupies a larger (wider) area, and will also provide improved angular resolution (as compared to the physical array) since angular resolution is inversely proportional to aperture size. However, the MIMO virtual array aperture 202 is a "sparse" array which contains holes or gaps between the virtual array elements. These gaps in the MIMO virtual array 202 violate the Nyquist sampling requirements, and the resulting formed beams contain spurious side lobes because of under sampling and/or non-uniform sampling in the spatial domain. The presence of grating lobes, or spurious side lobes in general, increase the likelihood of false target detections in the angular domain. The disclosed spectral-domain auto-correlation based approach for constructing the difference co-array 203 by performing forward and backward difference co-array processing on the MIMO virtual array outputs 202 helps mitigate or suppress spurious sidelobes in the formed radar beam pattern, with each difference co-array element being formed by the number of contributing pairs 204 indicated for each antenna position 201.

To further improve the beamforming output of a difference co-array, a weighting unit 26 may be connected and configured to apply a weighting factor to the difference co-array beamforming output generated by the difference co-array processing unit 25. Assuming individual phase difference operation outputs are corrupted by independent identically distributed (i.i.d.) Gaussian random noise, the weighting unit 26 may be configured to compute a weighting factor that is derived based on the inverse of the noise standard deviation (std) to further suppress the spurious sidelobes present in the difference co-array angle spectrums. As described hereinabove, the averaging operation applied to each difference group essentially reduces the noise variance by the number of samples used for averaging. As a result, if K element-pairs contribute to a difference group for averaging, the noise variance is reduced by K times and the noise std is reduced by $\sqrt{K}$ times. Since heavier weight should be allocated to array outputs containing lower noise, a weight can be determined based on the inverse of the noise std of the output. As a result, the weight that is applied to the virtual element output is defined as the quotient of the number of samples used for averaging divided by the square-root of the number of samples used for averaging for each difference group. In selected embodiments, the weighting can be combined with the group averaging operation performed by the difference co-array processing unit 25. Because the weight is the square root of the group size, instead of averaging with the group size, the averaging can be done by dividing the sum with the square root of the group size.

To provide additional details for an improved understanding of selected embodiments of the present disclosure, reference is now made to Table 3 which provides an example of the virtual element outputs $\{z_{-4}, z_{-3}, z_{-2}, z_{-1}, z_0, z_1, z_2, z_3, z_4\}$ for a 9-element difference co-array at antenna positions $\{-4d, -3d, -2d, -d, 0, d, 2d, 3d, 4d\}$ that are constructed from a 4-element virtual MIMO array. The table also lists the corresponding number of samples used for averaging and associated weights which are applied to the virtual element outputs. In particular, the weighting is applied to the virtual element outputs by computing the quotient of the number of samples used for averaging divided by the square-root of the number of samples of the difference groups, thereby generating the virtual element outputs which are weighted based on the Gaussian noise assumption:

TABLE 3

| Difference Co-Array Element Spacing | Antenna Pair Indices | Virtual element output | Number of samples for averaging | Weight | Virtual element output with Weighting based on Gaussian Noise Assumption |
|---|---|---|---|---|---|
| −4d | $x_{1,4}$ | $z_{-4} = y_1 y_4^* = z_4^*$ | 1 | 1 | $z_{-4} = y_1 y_4^*$ |
| −3d | $x_{2,4}$ | $z_{-3} = y_2 y_4^* = z_3^*$ | 1 | 1 | $z_{-3} = y_2 y_4^*$ |
| −2d | $x_{1,3}$, $x_{3,4}$ | $z_{-2} = \frac{1}{2}(y_1 y_3^* + y_3 y_4^*) = z_2^*$ | 2 | $\sqrt{2}$ | $z_{-2} = \frac{1}{\sqrt{2}}(y_1 y_3^* + y_3 y_4^*)$ |
| −d | $x_{1,2}$, $x_{2,3}$ | $z_{-1} = \frac{1}{2}(y_1 y_2^* + y_2 y_3^*) = z_1^*$ | 2 | $\sqrt{2}$ | $z_{-1} = \frac{1}{\sqrt{2}}(y_1 y_2^* + y_2 y_3^*)$ |
| 0 | $x_{1,1}$, $x_{2,2}$, $x_{3,3}$, $x_{4,4}$ | $z_0 = \frac{1}{4}(y_1 y_1^* + y_2 y_2^* + y_3 y_3^* + y_4 y_4^*)$ | 4 | 2 | $z_0 = \frac{1}{2}(y_1 y_1^* + y_2 y_2^* + y_3 y_3^* + y_4 y_4^*)$ |
| d | $x_{2,1}$, $x_{3,2}$ | $z_1 = \frac{1}{2}(y_2 y_1^* + y_3 y_2^*)$ | 2 | $\sqrt{2}$ | $z_1 = \frac{1}{\sqrt{2}}(y_2 y_1^* + y_3 y_2^*)$ |
| 2d | $x_{3,1}$, $x_{4,3}$ | $z_2 = \frac{1}{2}(y_3 y_1^* + y_4 y_3^*)$ | 2 | $\sqrt{2}$ | $z_2 = \frac{1}{\sqrt{2}}(y_3 y_1^* + y_4 y_3^*)$ |
| 3d | $x_{4,2}$ | $z_3 = y_4 y_2^*$ | 1 | 1 | $z_3 = y_4 y_2^*$ |
| 4d | $x_{4,1}$ | $z_4 = y_4 y_1^*$ | 1 | 1 | $z_4 = y_4 y_1^*$ |

Figure 4:
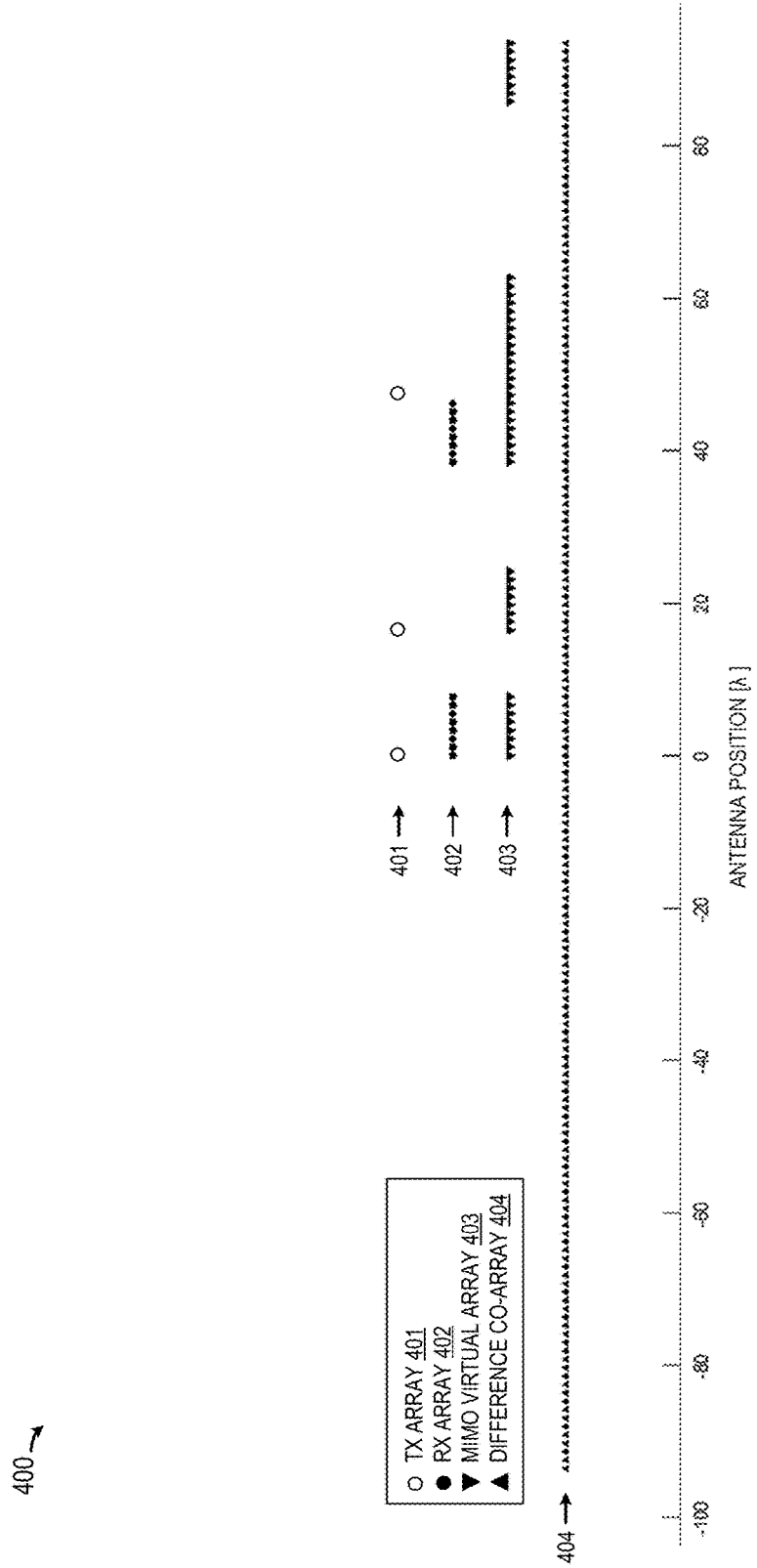
FIG. 4 depicts a simplified diagrammatic depiction of the physical radar arrays and corresponding sparse MIMO virtual array, along with the difference co-array constructed from the outputs of a sparse MIMO virtual array in accordance with selected embodiments of the present disclosure.

To provide additional details for an improved understanding of selected embodiments of the present disclosure, reference is now made to FIG. 4 which is a simplified diagrammatic depiction 400 of the physical radar arrays 401, 402 and corresponding sparse MIMO virtual array 403, along with the difference co-array 404 constructed from the outputs of a sparse MIMO virtual array 403. As depicted, the physical transmit radar array 401 is a 3-transmit antenna array, and the receiver radar array 402 is a 16-receive antenna array. The depicted sparse MIMO virtual array 403 is a 48-element array constructed from the physical arrays 401, 402 which has a larger aperture, but still includes a number of gaps or holes in the array 403. In addition, the difference co-array MIMO virtual array 404 is a 171-element array which is constructed from the outputs of a 48-element MIMO virtual array 403 which is formed from the physical arrays 401, 402. As constructed, the difference co-array 404 has a larger aperture than the 48-element MIMO virtual array 403, and the virtual antenna elements in the difference co-array 404 are positioned so that there are no gaps or holes that can create spurious sidelobes.

Figure 5A:
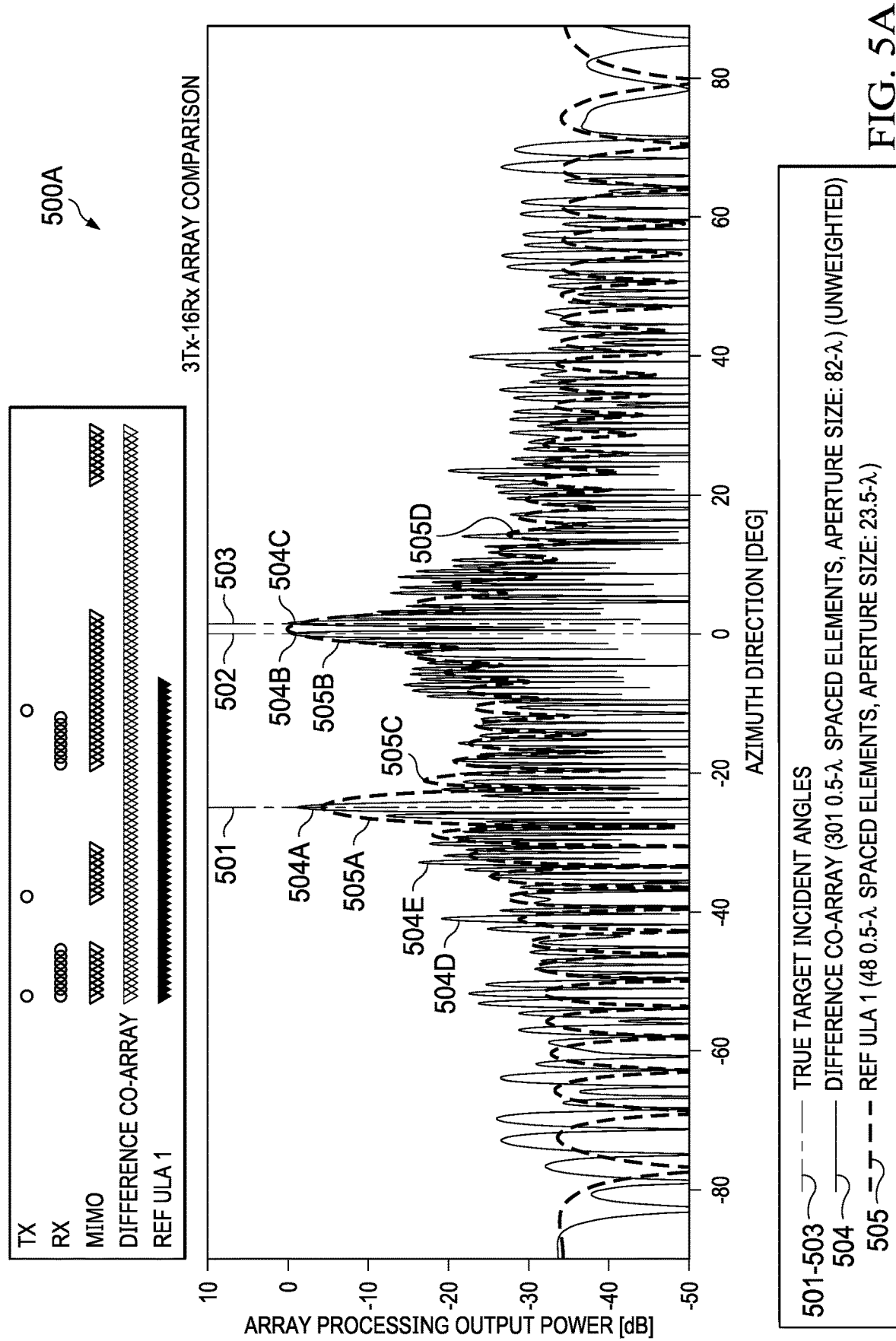
FIG. 5A depicts a simulated comparison of beamforming outputs of an example 301-element difference co-array without improved weighting and a reference 8-element Uniform Linear Array (ULA).
Figure 5B:
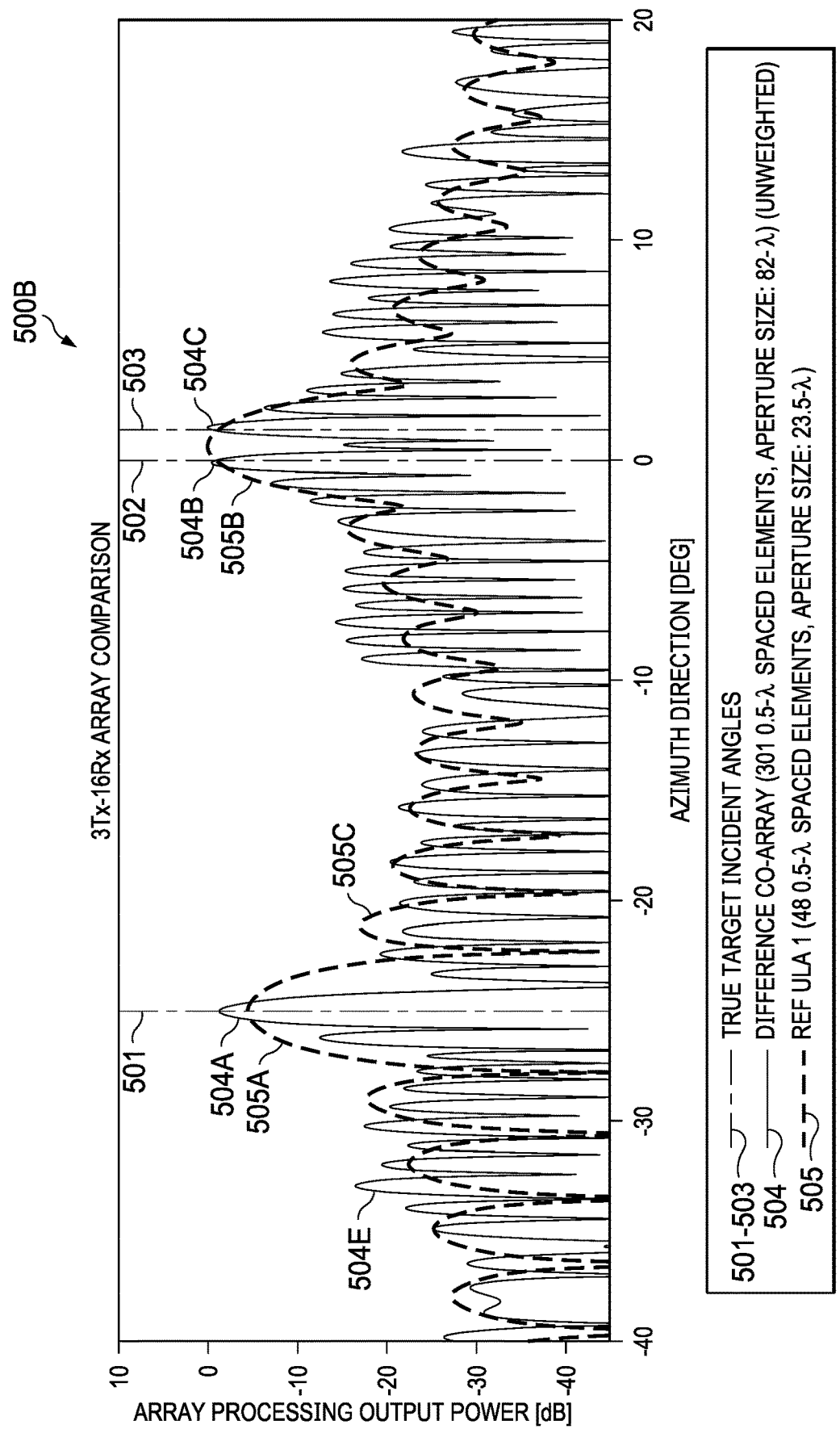
FIG. 5B depicts an enlarged view of the simulated beamforming outputs shown in FIG. 5A.

To illustrate the improved side lobe suppression benefits of the difference co-array processing techniques disclosed herein, reference is now made to FIGS. 5A and 5B which depict a first view 500A (FIG. 5A) and enlarged view 500B (FIG. 5B) of a computer simulation of the normalized spatial frequency or angle spectrum (hereinafter, angle spectrum) comparison of two beamformer output results 504, 505. The first beamformer output results 504 are for an example 301-element difference co-array for resolving three closely-spaced targets in accordance with selected embodiments of the present disclosure. For comparison purposes, the second beamformer output results 505 are for a reference 48-element Uniform Linear Array (ULA) for resolving the same three closely-spaced targets. In both cases, the element spacing is a half wavelength (0.5λ), with the difference co-array aperture size being 82 wavelengths (82λ), and the reference ULA aperture size being 23.5 wavelengths (23.5λ).

In the depicted simulations 500A, 500B, the locations of the three targets are shown, respectively, with the true target angle or spatial frequencies (corresponding to target directions) 501-503. In addition, the beamforming angle spectrum 504 is generated using a Fast Fourier Transform (FFT) of the virtual MIMO array output with a difference co-array, such as the array output of the difference co-array 404 shown in FIG. 4. And for comparison purposes, the beamforming angle spectrum 505 is generated using a ULA with 48 elements. In the difference co-array beamforming waveform 504, the spurious side lobes are suppressed with respect to the detection lobes. This is seen in FIGS. 5A-B where the difference co-array angle spectrum 504 includes individual lobes 504A-C which, respectively, contain the true spatial frequencies 501-503 for the three targets, and also includes suppressed spurious side lobes (e.g., 504D-E). In similar fashion, the ULA beamforming angle spectrum 505 shows that the three targets cannot be completely resolved since the angle spectrum 505 includes a first individual lobe 505A containing the first true spatial frequency 501, and also includes a second individual lobe 505B containing both of the true spatial frequencies 502 and 503, thus the spatial frequencies 502 and 503 cannot be separately delineated. In addition, the ULA beamforming angle waveform 505 also has suppressed spurious side lobes (e.g., 505C, 505D) which are generally more suppressed than the spurious side lobes (e.g., 504D-E) from the difference co-array beamforming waveform 504.

Figure 6A:
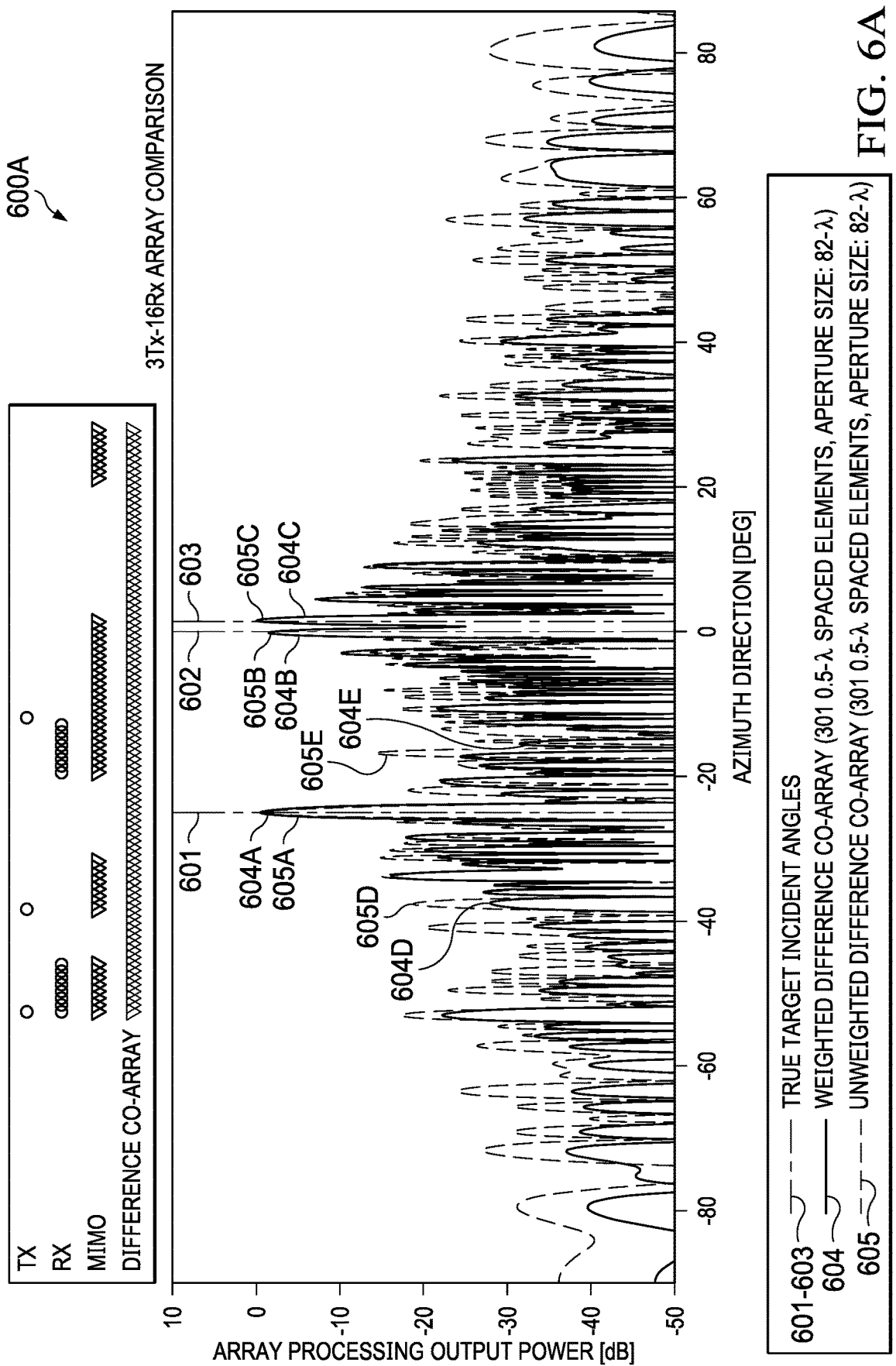
FIG. 6A depicts a simulated comparison of beamforming outputs of an example 301-element difference co-array with and without improved weighting.
Figure 6B:
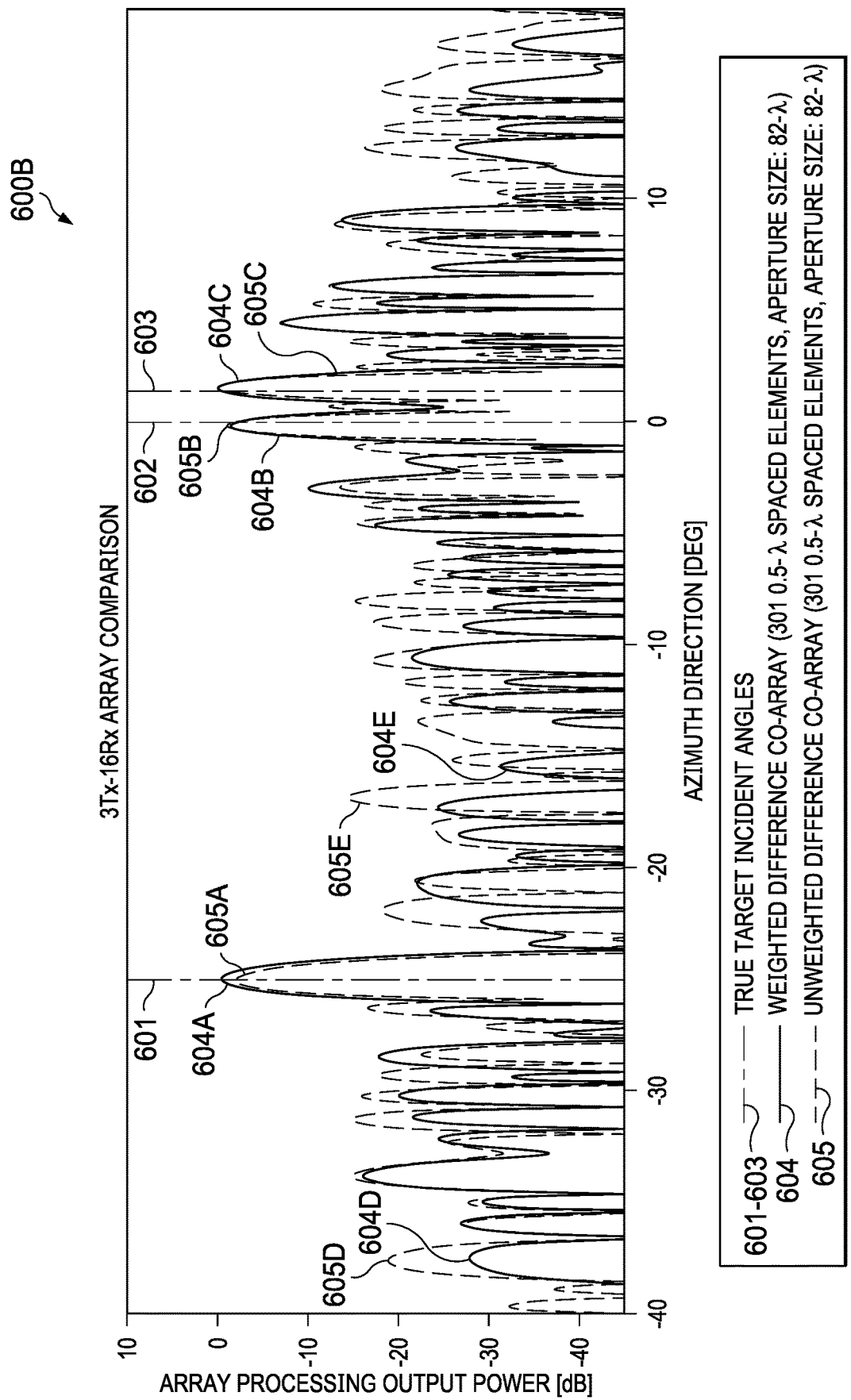
FIG. 6B depicts an enlarged view of the simulated beamforming outputs shown in FIG. 6A.

To reduce the false detection rate that can arise from large spurious side lobes, a weighting may be applied to the difference co-array output to further suppress the spurious sidelobes. The effect from the weighting can be seen in FIGS. 6A and 6B which depict a first view 600A (FIG. 6A) and enlarged view 600B (FIG. 6B) of a computer simulation of a weighted difference co-array angle spectrum 604 and an unweighted difference co-array angle spectrum 605, both which have an element spacing of a half wavelength (0.5λ), and an aperture size of 82 wavelengths (82λ). In particular, the first beamformer output results 604 are for an example 301-element difference co-array in which weighting values are applied to suppress output sidelobes for resolving three closely-spaced targets in accordance with selected embodiments of the present disclosure. In this case, the weighted difference co-array angle spectrum output 604 is the convolution of the weighting function's spectrum with the angle spectrum of the unweighted difference co-array's output. As will be appreciated, the weighting can be used in conjunction with the conventional windowing function for sidelobe suppression or used alone. For comparison purposes, the second beamformer output results 605 are for an example 301-element difference co-array that does not apply weighting to the outputs. As can be seen, the second beamformer output results for the unweighted difference co-array angle spectrum 605 is identical to the unweighted difference co-array angle spectrum 504 shown in FIGS. 5A-B.

In the depicted simulations 600A, 600B, the locations of the three targets are shown, respectively, with the true target angle or spatial frequencies (corresponding to target directions) 601-603. In addition, the weighted and unweighted difference co-array angle spectrums 604, 605 each include individual lobes 604A-C, 605A-C that are able to delineate and detect the true spatial frequencies 601-603 for the three targets. The weighted and unweighted difference co-array angle spectrums 604, 605 also include spurious side lobes (e.g., 604D-E, 605D-E) that are suppressed with respect to the individual detection lobes 604A-C, 605A-C. However, with the weighted difference co-array beamforming waveform 604, the spurious side lobes (e.g., 604D-E) are suppressed further than the spurious side lobes (e.g., 605D-E) of unweighted difference co-array beamforming waveform 605.

While the difference co-array processing techniques disclosed hereinabove improve the angular resolution and reduce the spurious side lobes, there may be additional need for suppressing the spurious side lobes. To this end, the difference co-array processing module 25 may be configured to further reduce the spurious side lobes by spatially smoothing the forward/backward difference co-array element outputs in the forward direction. As will be appreciated, spatial smoothing is a technique used in array signal covariance matrix construction for the purpose of increasing the matrix rank as well as decorrelating coherent signals. As disclosed herein, spatial smoothing may be used for improving the arrival signal's progressive phase change measurement by averaging out error contributions. The difference co-array processing module 25 may be operatively configured to define a size of the spatially smoothed aperture size. If the smoothed aperture is of the same size as the original aperture size, no spatial smoothing is performed. However, if the smoothed aperture size is smaller, then a sliding-window averaging operation is taken to produce the averaged outputs. Note that the spatial smoothing requires a virtual array of equally spaced antenna elements. If the virtual array does not have equally spaced antenna elements, this method does not apply.

In addition or in the alternative, the difference co-array processing module 25 may be configured to further reduce the spurious side lobes by producing a composite beamforming output. To this end, the difference co-array processing module 25 may be configured to multiply the beamforming output of the forward/backward difference co-array (with or without spatial smoothing applied) with the beamforming output of the MIMO virtual array unit 24. The selected MIMO virtual array section ideally should not be under-sampled (e.g., a section that forms a uniform linear array). In lieu of a filled section of array, a section that is least sparse (i.e., a few holes allowed) should be selected. By doing so, the spurious sidelobes in the output of the difference co-array process are greatly suppressed.

Figure 7:
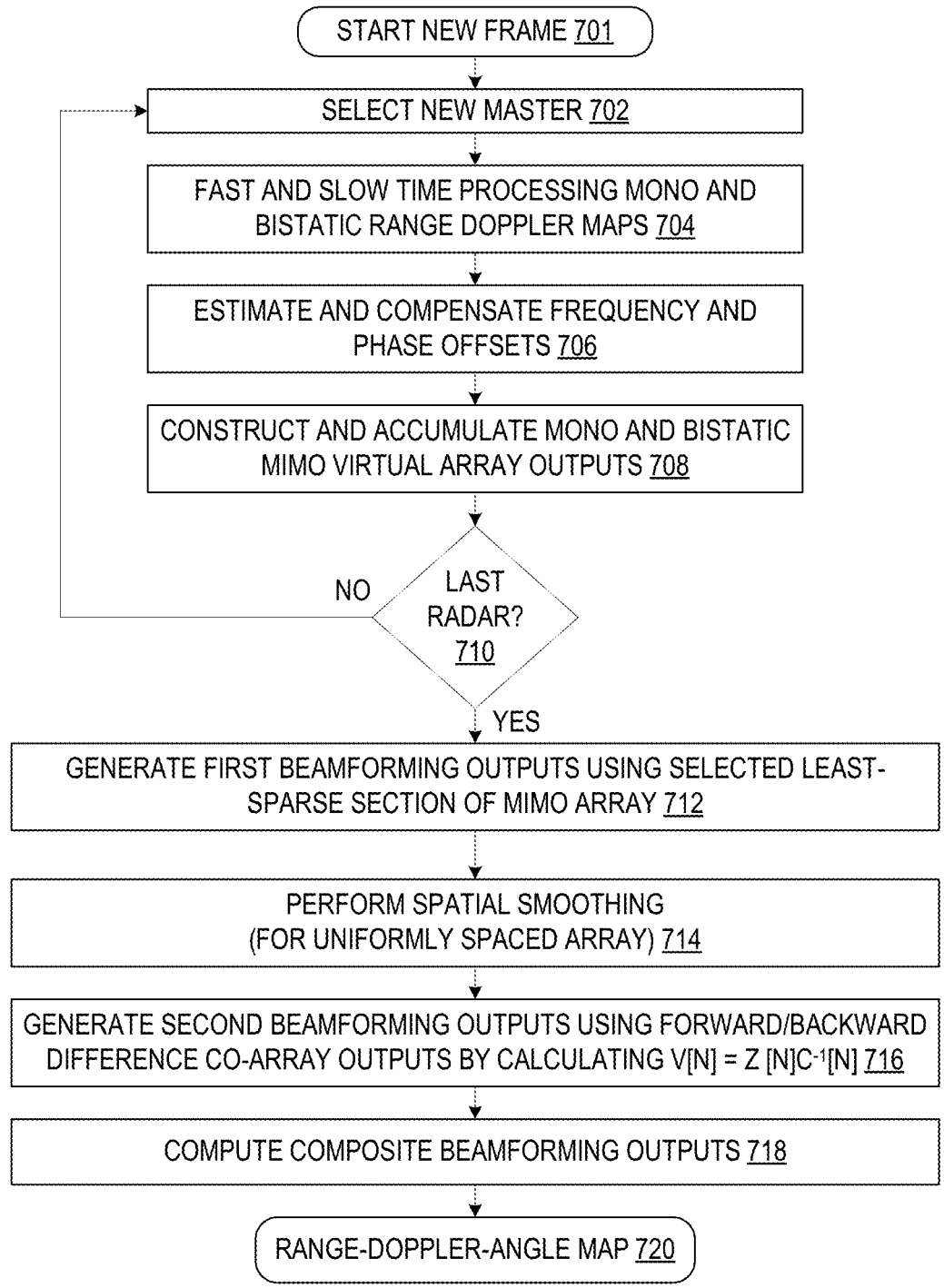
FIG. 7 illustrates a simplified flow chart showing the logic for combining multiple distributed small-aperture radars to form a virtually large coherent aperture in accordance with selected embodiments of the present disclosure.

To provide additional details for an improved understanding of selected embodiments of the present disclosure, reference is now made to FIG. 7 which depicts a simplified flow chart 700 showing the logic for combining multiple distributed small-aperture radars to form a virtually large coherent aperture. In an example embodiment, the control logic and methodology 700 shown in FIG. 7 may be implemented in whole or in part as hardware and/or software on a host computing system, processor, or microcontroller unit that includes processor and memory for storing programming control code for constructing and operating a large virtual aperture radar by coherently combining distributed small aperture radars which do not share a common local oscillator signal.

The process starts (step 701), such as when a new radar frame is started. In radar systems, the transmitted radar signal may be periodically modulated, such as by applying a frequency and/or phase shift. The period is typically chosen such that the radar signal modulation occurs between two time frames of the signal, where a time frame may, for example, correspond with a "chirp" in an FMCW (frequency modulation continuous wave) signal.

At step 702, one of the distributed radars is selected or designated as the master unit, and any remaining distributed radar is selected or designated as a slave unit. The result of this selection is that, when the selected master-unit unit transmits on any transmit antenna, the other slave unit(s) turn off their transmit antennas and operate only in receiver mode. As the process iteratively repeats itself through steps 704-708 as described below, the processing at step 702 sequentially alternates the master unit role amongst the distributed radars by selecting a new master radar at each iteration until all of the radars have been selected to operate as the master unit. In each iteration, the selected master-unit radar may sequentially transmit radar waveforms from each transmit antenna on the master unit radar, and the target returns from master radar's transmitted waveforms are directionally received at the receiver antenna(s) of the master radar and also at the receiver antenna(s) of the designated slave-unit radar(s). To initiate operations at the distributed master and slave units, a trigger may be sent to all units to signal the start of a chirp.

At step 704, each slave-unit radar processes the master radar's transmitted waveforms by applying predetermined radar signal processing steps to the radar waveforms received at each slave unit's receiver antenna(s). While any suitable radar signal processing steps may be used, each slave-unit radar may be configured to perform the same fast-time and slow-time processing on the received radar signal in the same way it processes its own target returns range and Doppler processing steps for the radar waveforms received at each slave unit's receiver antenna(s). For example, the slave-unit radar may apply range and Doppler FFT processing to generate mono-static and bi-static range Doppler maps.

At step 706, each slave-unit radar (or the radar controller) calculates or estimates frequency and phase offset values, and then applies the offsets to compensate for frequency and phase differences between the master-unit radar and slave-unit radar. While any suitable estimation technique may be used to calculate the chirp starting frequency offset ($\Delta f_o$) and master-slave phase offset ($\Delta \varphi$), selected embodiments of the present disclosure configure each slave-unit radar may to estimate these values based on the differences between the estimated range and Doppler measurements with the known truth. More specifically, a signal processing algorithm is implemented with software instructions which are executed to directly derive the frequency offset ($\Delta f_0$) from the Doppler position of the identified eavesdropped signal peak on the range-Doppler map. In addition, the master-slave phase offset ($\Delta\varphi$) may be solved from the instantaneous frequency model:

$$f_{ms}(t) = \frac{d}{dt}\left((\Delta f_0 + (\dot{f} + \Delta\dot{f})\Delta t_0)t + \frac{1}{2}\Delta \dot{f} t^2 + (f_0 + \Delta f_0)\Delta t_0 + \frac{1}{2}(\dot{f} + \Delta\dot{f})\Delta t_0^2 + \frac{\Delta\varphi}{2\pi}\right),$$

based on the range-FFT estimated value $\text{off}_{ms}(t)$ and the known or negligible values of $f_0$, $\Delta f_0$, $\Delta t_0$, $\dot{f}$, and $\Delta\dot{f}$. Once the frequency and phase offset values are derived for each slave-unit radar, the slave radars apply the estimated frequency and phase offsets to produce coherent target measurements. In this way, each slave-unit radar (or radar controller) processes the slave-received master signal data to estimate the slave unit's frequency and phase offsets to the master unit's, thereby allowing the slave-unit radar to generate coherent target data samples that are correlated in time, frequency, and phase with the master-unit radar.

At step 708, the correlated target return data samples received from the distributed radar devices are processed using bi-static radar principles to construct and accumulate mono-static and bi-static MIMO virtual array outputs by combining the distributed apertures, but without requiring physically mixing the received master-unit's transmissions with received target returns or sharing a local oscillator signal. In selected embodiments, the processing of correlated target return data samples generated by each master-unit is performed at the radar controller processor to generate a bi-static MIMO virtual array which includes a mono-static MIMO virtual array elements and bi-static MIMO virtual array elements.

At step 710, the process determines if all of the distributed radars have been designated to operate as the master-unit radar. If not (negative outcome to detection step 710), then the process returns to step 702 to select another one of the distributed radars as the new master-unit, and steps 704-710 are repeated until all radars have been selected as the master unit once. However, if the last radar has been selected as a master-unit (affirmative outcome to detection step 710), then the process may proceed to perform additional processing.

At step 712, a least-sparse portion of the accumulated MIMO virtual array outputs generated at step 708 are processed to generate a first set of beamforming outputs. In selected embodiments, the processing of MIMO virtual array outputs is performed at the radar controller processor to generate a first set of beamforming outputs using a selected least-sparse section of the MIMO virtual array.

At step 714, additional processing is applied to suppress or reduce spurious side lobes by performing spatial smoothing on the beamforming outputs if the MIMO array is uniformly spaced. In selected embodiments, the radar controller processor may be configured to spatially smooth the beamforming outputs. However, if the formed virtual array does not have equally spaced antenna elements, then step 714 is skipped.

At step 716, the (spatially smoothed) MIMO array beamforming outputs are processed to construct forward different co-array outputs, alone or in combination with backward difference co-array outputs, to generate a set of beamforming outputs that define an extended MIMO virtual aperture based on MIMO radar principles. In selected embodiments, the processing of the (spatially smoothed) MIMO array outputs is performed at the radar controller processor by using a spectral-domain auto-correlation based approach described hereinabove for calculating the final difference co-array output array $v[n]=z[n]c^{-1}[n]$, $(n=-N+1, \ldots N-1)$. In selected embodiments, the forward difference co-array outputs are constructed by the radar controller processor which determines relative distance positions of the antenna elements in the MIMO array, identifies all combinations of antenna element pairs $x_i$, $x_j = x_i - x_j$ having a zero or positive difference spacing, and then calculates virtual forward co-array element outputs. If desired, angle processing, such as beamforming, can then be carried out based on the forward difference co-array construction, resulting in a bi-static MIMO forward difference virtual co-array aperture that is the same size as, but less sparse than, the bi-static MIMO virtual array aperture. In addition, the radar controller processor may construct the backward difference co-array outputs by identifying all combinations of antenna element pairs $x_i$, $x_j = x_i - x_j$ having a zero or negative difference spacing and then calculating virtual backward co-array element outputs. If desired, angle processing can then be carried out based on the forward and backward difference co-array construction, resulting in a bi-static MIMO forward/backward difference virtual co-array aperture that is larger than, and less sparse than, the bi-static MIMO virtual array aperture. The size of the resulting aperture is almost doubled and the aperture is fuller, which results in improved angular resolution and improved spurious sidelobe performance. In addition, a weighting factor may be applied to the difference co-array beamforming output by calculating a factor that is derived based on the inverse of the noise standard deviation in order to suppress spurious sidelobes present in the difference co-array angle spectrums. In selected embodiments where weighting factor is the square root of the group size, instead of averaging with the group size, the averaging can be done by dividing the sum with the square root of the group size.

At step 718, additional processing is applied to suppress or reduce spurious side lobes by computing composite beamforming outputs. In selected embodiments, the radar controller processor may be configured to produce a composite beam forming output by multiplying the beam forming output of the forward/backward difference co-array (with or without spatial smoothing applied) with the beam forming output of a section of the MIMO virtual array. By doing so, the spurious sidelobes in the output of the difference co-array process are greatly suppressed.

As will be appreciated by persons skilled in the art, the computed difference co-array output can be further processed using any super-resolution angle estimation algorithms, included but not limited to the beamforming algorithms based on Fourier analysis of the spatial frequency components of the co-array outputs, such as Discrete Fourier Transform or Fast Fourier Transform. Alternative super-resolution angle estimation algorithms include, but not limit to, Multiple Signal Classification (MUSIC) algorithm and its derivatives, Rotational Invariance (ESPRIT) algorithm and its derivatives, Matrix Pencil algorithm and its derivatives, Method of Direction Estimation (MODE) algorithm, Noise or Signal Subspace Fitting algorithm or its derivatives, Maximum Likelihood Estimator based algorithms, and Sparsity Constraint based or L1-Norm minimization based algorithms, among others.

In addition, it will be understood that the forward and backward difference co-array processing can be applied to a distributed radar system whose apertures are physically separated but share a common LO signal via a physical link. In this case, the eavesdropping processing steps are removed. In addition, the forward and backward difference co-array processing can be applied to a single radar system whose either physical antenna array or virtual MIMO array is sparse. In this case, the processing steps reduce to monostatic case and the need for making two distributed radar coherent is removed, as there is only a single coherent radar.

At step 720, the target map is generated to identify the range, Doppler, and angle values for each detected target. In selected embodiments, the radar controller processor may be configured to produce map data identifying paired range (r), Doppler (ṙ) and angle (θ) values for each detected/target object.

Figure 8:
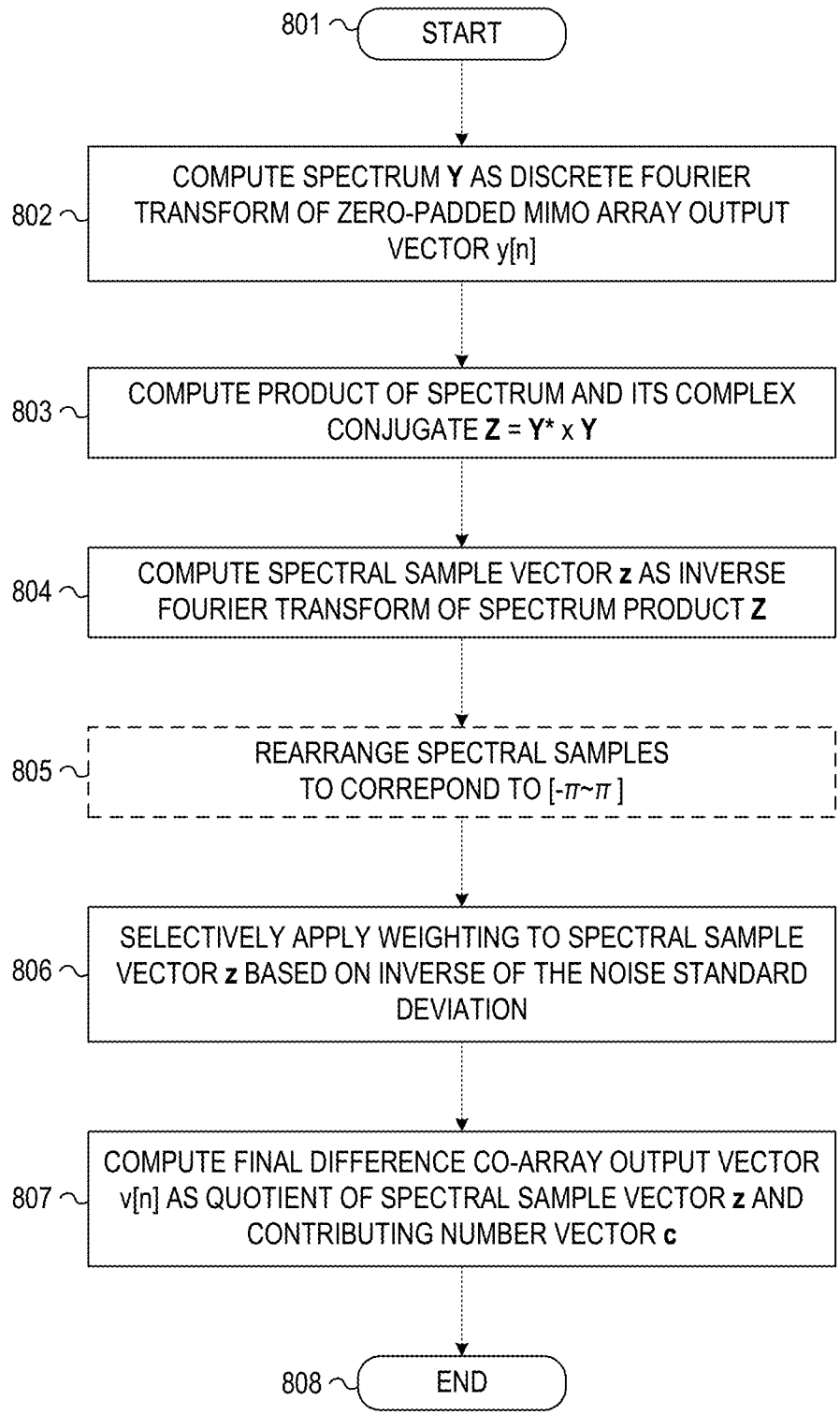
FIG. 8 illustrates a simplified flow chart showing the logic for forming a virtually large aperture from a physically smaller and sparsely populated antenna array with a difference co-array construction computing method in accordance with selected embodiments of the present disclosure.

To provide additional details for an improved understanding of selected embodiments of the present disclosure, reference is now made to FIG. 8 which depicts a simplified flow chart 800 showing the logic for forming a virtually large aperture from a physically smaller and sparsely populated antenna array with a difference co-array construction computing method. In an example embodiment, the control logic and methodology 800 shown in FIG. 8 may be implemented in whole or in part as hardware and/or software, though selected embodiments may use hardware FFT accelerators to construct the difference co-array which may be further weighted to improve the angle spectrum estimates.

The process starts (step 801), such as when a new radar frame is started. In radar systems, the transmitted radar signal may be periodically modulated, such as by applying a frequency and/or phase shift in the form of a "chirp" to generate a frequency modulation continuous wave (FMCW) signal.

At step 802, a spectrum value Y is computed as the discrete Fourier transform of a zero-padded MIMO array output vector y[n]. In selected embodiments, the processing of the discrete Fourier transform $\mathcal{F}\{y\}$ computed at step 802 may be efficiently computed using hardware SoC FFT accelerators to calculate the spectrum value Y as the Fast Fourier Transform implementation, $Y=\mathcal{F}\{y\}=FFT\{y\}$.

At step 803, the spectrum product Z is computed from the spectrum value Y and its complex conjugate Y*. In selected embodiments, the computation of the spectrum product Z=Y*Y may be efficiently computed using a hardware multiplier and/or software processing functionality to compute the element-wise product of the spectrum value Y and its complex conjugate Y*.

At step 804, the spectral sample vector z is computed by taking the inverse Fourier transform of the spectral product Z. In selected embodiments, the processing of the inverse Fourier transform $\mathcal{F}^{-1}\{Z\}$ computed at step 804 may be efficiently computed using hardware SoC IFFT accelerators to calculate the spectral sample vector z as the inverse Fast Fourier Transform implementation, $z=\mathcal{F}^{-1}\{Z\}=IFFT\{Z\}$.

At step 805, and optional sample reordering may be performed, depending on the hardware implementation used to perform the inverse fast Fourier transform at step 804. In particular, if the IFFT operation outputs spectral samples corresponding to the [0~2π] radian frequency range, then the processing at step 805 may rearrange the spectral samples from z to correspond to the [−π~π3] radian frequency range by moving the last half to the front. However, as indicated by the dashed lines, the rearrangement of the spectral samples z may be omitted if the IFFT operation outputs spectral samples corresponding to the [−π~π] radian frequency range.

At step 806, one or more weighting values may be selectively applied to the spectral sample vector z, where the weighting values are based on the inverse of the noise standard deviation. In selected embodiments, the weighting values may be efficiently computed using a hardware multiplier and/or software processing functionality to calculate the square-root of the number of samples used for averaging for each difference group. The weighting can be implemented by multiplying the spectral sample vector z by a quotient computed by dividing the group size (e.g., the number of samples used for averaging) by the square root of the group size. In selected embodiments, the step for applying weighting values to the spectral sample vector z may be omitted.

At step 807, the final difference co-array output array v is computed as the quotient of the (weighted) spectral sample vector z and the contributing number vector c. In selected embodiments, the contributing number vector c may be retrieved from memory where it was previously stored after being pre-calculated as described hereinabove. In selected embodiments, the computation of the final difference co-array output array v may be efficiently computed using a hardware multiplier and/or software processing functionality to compute $v[n]=z[n]c^{-1}[n]$ (n=−N+1, . . . , N−1). Equivalently, the final difference co-array output array v may be efficiently computed as $$v[n] = \frac{z[n]}{c[n]} (n = -N+1, \ldots, N-1).$$

At step 808, the method of forming the final difference co-array output vector ends, at which point angle processing, such as beamforming, can then be carried out.

As disclosed herein, selected embodiments of the disclosed distributed aperture radar system may provide several enhancements when compared with conventional radar systems. In addition to enabling the construction of a single large coherent aperture from two or more distributed radars which achieves high angular resolution and suppresses spurious side lobes, the disclosed distributed aperture radar system can use RF front-end and signal processing blocks of existing radar designs without modifications, thereby minimizing the cost of developing the new solution. In addition, the present disclosure provides an efficient implementation for constructing difference co-arrays using FFTs or spectral domain approach to take advantage of FFT accelerator hardware. In addition, when distributed radars are separated at a distance, the formed apertures are typically sparse in nature, resulting in spurious sidelobes, so the ability to mitigate or suppress the side lobes by selectively applying weighting factors as disclosed herein enables larger separation between the radars without significantly increasing false detections.

By now it should be appreciated that there has been provided a distributed aperture radar architecture, circuit, method, and system that includes a plurality of small aperture radar devices that are physically distributed from one another and connected to a radar control processing unit. Each of the small aperture radar devices includes a first plurality of transmit antennas which are controlled by the radar control processing unit to transmit orthogonal MIMO radar signals. In addition, each small aperture radar device includes a first plurality of receive antennas which are controlled by the radar control processing unit to receive MIMO radar signal returns. Each of the small aperture radar devices also includes a receive processing module which is configured to generate digital output signals from the MIMO radar signal returns. The radar control processing unit is configured to process the digital output signals generated by the plurality of small aperture radar devices to construct a sparse MIMO virtual array aperture. The radar control processing unit is also configured to construct an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture. In selected embodiments, the radar control processing unit is configured to construct the extended difference co-array virtual array aperture by using the FFT hardware accelerator to perform spectral-domain auto-correlation based processing when performing forward and backward difference co-array processing on the sparse MIMO virtual array aperture. In selected embodiments, the radar control processing unit is further configured to compute and apply weighting factors to the beamforming outputs of the extended difference co-array virtual array aperture, where the weighting factors are based on an inverse of a noise standard deviation of the beamforming outputs from the extended difference co-array virtual array aperture. In such embodiments, the radar control processing unit may be configured to compute a weighting factor for each beamforming output of the extended difference co-array virtual array aperture as a quotient of a group size used for averaging the beamforming output divided by a square-root of the group size. In order to construct the extended difference co-array virtual array aperture, the radar control processing unit is configured to compute a spectrum value Y as a fast Fourier transform of a zero-padded MIMO array output vector y. In addition, the radar control processing unit is configured to compute a spectrum product Z as a product of the spectrum value Y and a complex conjugate of the spectrum value Y*. The radar control processing unit is also configured to compute a spectral sample vector z as an inverse Fourier transform of the spectrum product Z. In addition, the radar control processing unit is configured to compute a final difference co-array output vector v as a quotient of the spectral sample vector z and a contributing number vector c retrieved from memory. As will be understood by those skilled in the art, if the angle estimation process is FFT and the weighting step and the division of c step are omitted for speed (at the cost of reduced performance), the angle spectrum can be directly obtained from Z.

In another form, there is provided a method, architecture, circuit, and system for operating a radar system comprising a plurality of transmit and receive antennas and a radar control processing unit. In the disclosed methodology, orthogonal MIMO radar signals are transmitted from transit antennas in the plurality of transmit and receive antennas. In response, MIMO radar signal returns are received from receive antennas in the plurality of transmit and receive antennas. The received MIMO radar signal returns are processed to generate one or more digital signal return output signals. At the radar control processing unit, a sparse MIMO virtual array aperture is constructed from the one or more digital signal return output signals. The radar control processing unit also constructs beamforming outputs of an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture. In selected embodiments, the beamforming outputs are constructed using the FFT hardware accelerator to perform spectral-domain auto-correlation based processing when performing forward and backward difference co-array processing on the sparse MIMO virtual array aperture. In selected embodiments, the beamforming outputs are constructed by computing a spectrum value Y as a fast Fourier transform of a zero-padded MIMO array output vector y, computing a spectrum product Z as a product of the spectrum value Y and a complex conjugate of the spectrum value Y*, computing a spectral sample vector z as an inverse Fourier transform of the spectrum product Z, and computing a final difference co-array output vector v as a quotient of the spectral sample vector z and a contributing number vector c retrieved from memory. In selected embodiments, the radar control processing unit also computes weighting factors and applies the weighting factors to the beamforming outputs of the extended difference co-array virtual array aperture, where the weighting factors are based on an inverse of a noise standard deviation of the beamforming outputs from the extended difference co-array virtual array aperture. In such embodiments, a weighting factor is computed for each beamforming output of the extended difference co-array virtual array aperture as a quotient of a group size used for averaging the beamforming output divided by a square-root of the group size.

In yet another form, there is provided a radar system, architecture, circuit, and method that includes a plurality of transmit and receive antennas and a radar control processing unit that is configured to estimate target parameters. The transmit and receive antennas are configured to generate target returns by transmitting MIMO radar signals from transit antennas and receiving MIMO radar signal returns from receive antennas which are processed to generate the target returns. In addition, the radar control processing unit is configured construct a sparse MIMO virtual array aperture from the one or more digital signal return output signals from the target returns. The radar control processing unit is also configured to construct beamforming outputs of an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture. In selected embodiments, the beamforming outputs are constructed by using the FFT hardware accelerator to perform spectral-domain auto-correlation based processing when performing forward and backward difference co-array processing on the sparse MIMO virtual array aperture by computing a spectrum value Y as a fast Fourier transform of a zero-padded MIMO array output vector y; computing a spectrum product Z as a product of the spectrum value Y and a complex conjugate of the spectrum value Y*; computing a spectral sample vector z as an inverse Fourier transform of the spectrum product Z; and computing a final difference co-array output vector v as a quotient of the spectral sample vector z and a contributing number vector c retrieved from memory. In addition, the radar control processing unit is configured to construct a target map from the beamforming outputs of the extended difference co-array virtual array aperture to identify the range, Doppler, and angle values for one or more detected targets identified by the target returns. In selected embodiments, the radar control processing unit is also configured to compute and apply weighting factors to the beamforming outputs of the extended difference co-array virtual array aperture, where the weighting factors are based on an inverse of a noise standard deviation of the beamforming outputs from the extended difference co-array virtual array aperture. In such embodiments, a weighting factor is computed for each beamforming output of the extended difference co-array virtual array aperture as a quotient of a group size used for averaging the beamforming output divided by a square-root of the group size.

Although the described exemplary embodiments disclosed herein focus on example automotive radar circuits, systems, and methods for using same, the present invention is not necessarily limited to the example embodiments illustrate herein. For example, various embodiments of a distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A distributed aperture radar system comprising a plurality of small aperture radar devices that are physically distributed from one another and connected to a radar control processing unit;
   wherein each of the plurality of small aperture radar devices comprises:
      a first plurality of transmit antennas which are controlled by the radar control processing unit to transmit orthogonal MIMO radar signals,
      a first plurality of receive antennas which are controlled by the radar control processing unit to receive MIMO radar signal returns, and
      a receive processing module which is configured to generate digital output signals from the MIMO radar signal returns; and
   wherein the radar control processing unit is configured:
      to process the digital output signals generated by the plurality of small aperture radar devices to construct a sparse MIMO virtual array aperture, and
      to construct beamforming outputs of an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture.

2. The distributed aperture radar system of claim 1, where the radar control processing unit is further configured to compute and apply weighting factors to the beamforming outputs of the extended difference co-array virtual array aperture, where the weighting factors are based on an inverse of a noise standard deviation of the beamforming outputs from the extended difference co-array virtual array aperture.

3. The distributed aperture radar system of claim 2, where the radar control processing unit is configured to compute a weighting factor for each beamforming output of the extended difference co-array virtual array aperture as a quotient of a group size used for averaging the beamforming output divided by a square-root of the group size.

4. The distributed aperture radar system of claim 1, where the radar control processing unit is configured to construct the extended difference co-array virtual array aperture by using the FFT hardware accelerator to perform spectral-domain auto-correlation based processing when performing forward and backward difference co-array processing on the sparse MIMO virtual array aperture.

5. The distributed aperture radar system of claim 1, where the radar control processing unit is configured to construct the extended difference co-array virtual array aperture by computing a spectrum value Y as a fast Fourier transform of a zero-padded MIMO array output vector y.

6. The distributed aperture radar system of claim 5, where the radar control processing unit is configured to construct the extended difference co-array virtual array aperture by computing a spectrum product Z as a product of the spectrum value Y and a complex conjugate of the spectrum value $Y^*$.

7. The distributed aperture radar system of claim 6, where the radar control processing unit is configured to construct the extended difference co-array virtual array aperture by computing a spectral sample vector z as an inverse Fourier transform of the spectrum product Z.

8. The distributed aperture radar system of claim 7, where the radar control processing unit is configured to construct the extended difference co-array virtual array aperture by computing a final difference co-array output vector v as a quotient of the spectral sample vector z and a contributing number vector c retrieved from memory.

9. A method for operating a radar system comprising a plurality of transmit and receive antennas and a radar control processing unit, the method comprising:
   transmitting orthogonal MIMO radar signals from transit antennas in the plurality of transmit and receive antennas;
   receiving MIMO radar signal returns from receive antennas in the plurality of transmit and receive antennas;
   processing the MIMO radar signal returns to generate one or more digital signal return output signals;

constructing, at the radar control processing unit, a sparse MIMO virtual array aperture from the one or more digital signal return output signals; and constructing, at the radar control processing unit, beamforming outputs of an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture.

10. The method of claim 9, further comprising computing, at the radar control processing unit, weighting factors and applying the weighting factors to the beamforming outputs of the extended difference co-array virtual array aperture, where the weighting factors are based on an inverse of a noise standard deviation of the beamforming outputs from the extended difference co-array virtual array aperture.

11. The method of claim 10, where computing weighting factors comprises computing a weighting factor for each beamforming output of the extended difference co-array virtual array aperture as a quotient of a group size used for averaging the beamforming output divided by a square-root of the group size.

12. The method of claim 9, where constructing beamforming outputs of the extended difference co-array virtual array aperture comprises using the FFT hardware accelerator to perform spectral-domain auto-correlation based processing when performing forward and backward difference co-array processing on the sparse MIMO virtual array aperture.

13. The method of claim 9, where constructing beamforming outputs of the extended difference co-array virtual array aperture comprises computing a spectrum value Y as a fast Fourier transform of a zero-padded MIMO array output vector y.

14. The method of claim 13, where constructing beamforming outputs of the extended difference co-array virtual array aperture comprises computing a spectrum product Z as a product of the spectrum value Y and a complex conjugate of the spectrum value Y*.

15. The method of claim 14, where constructing beamforming outputs of the extended difference co-array virtual array aperture comprises computing a spectral sample vector z as an inverse Fourier transform of the spectrum product Z.

16. The method of claim 15, where constructing beamforming outputs of the extended difference co-array virtual array aperture comprises computing a final difference co-array output vector v as a quotient of the spectral sample vector z and a contributing number vector c retrieved from memory.

17. A radar system comprising:
a plurality of transmit and receive antennas configured to generate target returns by transmitting MIMO radar signals from transit antennas and receiving MIMO radar signal returns from receive antennas which are processed to generate the target returns; and a radar control processing unit configured to estimate target parameters by:

constructing a sparse MIMO virtual array aperture from the one or more digital signal return output signals from the target returns;

constructing beamforming outputs of an extended difference co-array virtual array aperture that is larger than the MIMO virtual array aperture by using an FFT hardware accelerator to perform spectral-domain auto-correlation based processing of the sparse MIMO virtual array aperture to fill in holes in the sparse MIMO virtual array aperture and to suppress spurious sidelobes caused by holes in the sparse MIMO virtual array aperture; and constructing a target map from the beamforming outputs of the extended difference co-array virtual array aperture to identify the range, Doppler, and angle values for one or more detected targets identified by the target returns.

18. The radar system of claim 17, where the radar control processing unit is configured to compute and apply weighting factors to the beamforming outputs of the extended difference co-array virtual array aperture, where the weighting factors are based on an inverse of a noise standard deviation of the beamforming outputs from the extended difference co-array virtual array aperture.

19. The radar system of claim 18, where computing weighting factors comprises computing a weighting factor for each beamforming output of the extended difference co-array virtual array aperture as a quotient of a group size used for averaging the beamforming output divided by a square-root of the group size.

20. The radar system of claim 17, where constructing beamforming outputs of the extended difference co-array virtual array aperture comprises using the FFT hardware accelerator to perform spectral-domain auto-correlation based processing when performing forward and backward difference co-array processing on the sparse MIMO virtual array aperture by:

computing a spectrum value Y as a fast Fourier transform of a zero-padded MIMO array output vector y;

computing a spectrum product Z as a product of the spectrum value Y and a complex conjugate of the spectrum value Y*;

computing a spectral sample vector z as an inverse Fourier transform of the spectrum product Z; and computing a final difference co-array output vector v as a quotient of the spectral sample vector z and a contributing number vector c retrieved from memory.

* * * * *